(12) United States Patent
Kubota et al.

(10) Patent No.: US 9,146,380 B2
(45) Date of Patent: Sep. 29, 2015

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/451,491

(22) Filed: Aug. 5, 2014

(65) Prior Publication Data
US 2015/0198787 A1   Jul. 16, 2015

(30) Foreign Application Priority Data

Jan. 10, 2014   (JP) ................................. 2014-002821

(51) Int. Cl.
*G02B 3/02*   (2006.01)
*G02B 13/00*   (2006.01)
*G02B 9/64*   (2006.01)

(52) U.S. Cl.
CPC .............. *G02B 13/0045* (2013.01); *G02B 9/64* (2013.01)

(58) Field of Classification Search
CPC .................................................... G02B 13/0045
USPC ............................................................ 359/716
See application file for complete search history.

(56) References Cited

U.S. PATENT DOCUMENTS

2014/0334015 A1 *  11/2014  Suzuki .......................... 359/708

FOREIGN PATENT DOCUMENTS

JP          2012-155223 A       8/2012

* cited by examiner

*Primary Examiner* — James Jones
(74) *Attorney, Agent, or Firm* — Kubotera & Associates, LLC

(57) ABSTRACT

An imaging lens includes a first lens group having positive refractive power; a second lens group having negative refractive power; and a third lens group having negative refractive power, arranged in this order from an object side to an image plane side. The first lens group includes a first lens having positive refractive power, a second lens having negative refractive power, and a third lens having positive refractive power. The second lens group includes a fourth lens and a fifth lens. The third lens group includes a sixth lens and a seventh lens. The fourth lens is formed in a shape so that a surface on the object side thereof has a negative curvature radius. The fifth lens is formed in a shape so that a surface on the image plane side thereof has a positive curvature radius. The first to third lenses have specific Abbe's numbers.

8 Claims, 18 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a portable device including a cellular phone and a portable information terminal, a digital still camera, a security camera, a vehicle onboard camera, and a network camera.

In recent years, in place of cellular phones that are intended mainly for making phone calls, so-called "smartphones" have been more widely used, i.e., cellular phones with functions of portable information terminals (PDA) and/or personal computers. Since the smartphones generally are highly functional as opposed to the cellular phones, it is possible to use images taken by a camera thereof in various applications.

Generally speaking, product groups of cellular phones and smartphones are often composed of products of various specifications, from products for beginner users to products for advanced users. Among them, an imaging lens for mounting in products for advanced users requires a lens configuration of high resolution, which can be applied also in high pixel count imaging elements.

As one of methods to achieve an imaging lens of high resolution, there is a method of increasing the number of lenses that compose the imaging lens. However, an increase in the number of lenses easily causes an increase in size of the imaging lens, so that such an approach is not favorable for mounting in the above-described small-sized cameras such as cellular phones and smartphones. For this reason, the imaging lenses have been developed while restraining an increase in the number of lenses as much as possible. However, with rapid technology advancement in increasing the pixel count of an imaging element in these days, it became more interesting to develop an imaging lens that can achieve high resolution rather than a short total track length of the imaging lens. For example, according to a camera unit that became newly available, it is possible to obtain quality images equivalent to those obtained by digital still cameras by attaching a camera unit having an imaging lens and an imaging element to cellular phones, smartphones, or the like, instead of mounting it in a cellular phone, smartphone, or the like as is conventional.

A lens configuration having seven lenses is slightly disadvantageous for downsizing of an imaging lens due to the large number of lenses that compose the imaging lens. However, since such lens configuration has flexibility in designs, it has potential to achieve satisfactory correction of aberrations and downsizing of the imaging lens in a balanced manner. As such imaging lens having a seven-lens configuration, there is known, for example, the one described in Patent Reference.

Patent Reference: Japanese Patent Application Publication No. 2012-155223

The imaging lens described in Patent Reference includes a first lens having a biconvex shape, a second lens that has a biconcave shape and is joined to the first lens, a third lens that is negative and has a shape of a meniscus lens directing a convex surface thereof to an object side, a fourth lens that is positive and has a shape of a meniscus lens directing a concave surface thereof to the object side, a fifth lens that is negative and has a shape of meniscus lens directing a convex surface thereof to the object side, a sixth lens having a biconvex shape, and a seventh lens having a biconcave shape, arranged in the order from the object side.

According to the imaging lens disclosed in Patent Reference, through restraining the ratio between a focal length of a first lens group composed of lenses from the first lens to the fourth lens and a focal length of a second lens group composed of the lenses from the fifth lens to the seventh lens within certain range, it is possible to achieve downsizing of the imaging lens and satisfactory correction of aberrations.

According to the imaging lens described in Patent Reference, the size of the imaging lens is small, but correction of an image surface is insufficient. Especially distortion is relatively large, there is a limit by itself in achieving a high resolution imaging lens. According to the lens configuration described in Patent Reference, it is difficult to achieve satisfactory aberration correction while downsizing the imaging lens.

Here, such difficulty is not a problem specific to the imaging lens to be mounted in cellular phones and smartphones. Rather, it is common even for an imaging lens to be mounted in a relatively small camera such as digital still cameras, portable information terminals, security cameras, onboard cameras, and network cameras.

In view of the above-described problems in the conventional techniques, an object of the present invention is to provide an imaging lens that can attain both downsizing and satisfactory correction of aberrations.

Further objects and advantages of the invention will be apparent from the following description of the invention.

SUMMARY OF THE INVENTION

In order to attain the objects described above, according to a first aspect of the present invention, an imaging lens includes a first lens group having positive refractive power, a second lens group having negative refractive power, and a third lens group having negative refractive power, arranged in the order from the object side to the image plane side. The first lens group includes a first lens having positive refractive power, a second lens having negative refractive power, and a third lens having positive refractive power. The second lens group includes a fourth lens and a fifth lens. The third lens group includes a sixth lens and a seventh lens. Among them, the fourth lens has an object-side surface having negative curvature radius. The fifth lens has an image plane-side surface having positive curvature radius. In addition, when the first lens has an Abbe's number vd1, the second lens has an Abbe's number vd2, and the third lens has an Abbe's number vd3, the imaging lens of the invention satisfies the following conditional expressions (1) to (3):

$$40 < vd1 < 75 \tag{1}$$

$$20 < vd2 < 35 \tag{2}$$

$$40 < vd3 < 75 \tag{3}$$

According to the invention, the imaging lens includes the three lens groups from the first lens group to the third lens group, and refractive powers of the lens groups are arranged in the order of positive, negative, and negative from the object side. Among them, the refractive powers of the first lens group and the second lens group are arranged in the order of positive and negative, so that a chromatic aberration is satisfactorily corrected in those lens groups.

Therefore, according to the imaging lens of the invention, it is possible to satisfactorily correct aberrations, especially the chromatic aberration, and also possible to obtain satisfactory image-forming performance necessary for a high-resolution imaging lens. In addition, according to the imaging lens of the invention, the third lens group has negative refractive power, so that it is possible to suitably reduce the size of the imaging lens.

The first lens group includes the three lenses, in which refractive powers are arranged in the order of positive, negative, and positive. Those three lenses are respectively formed from materials that satisfy the conditional expressions (1) through (3). With the arrangement of refractive powers and arrangement of the Abbe's numbers of those lenses, in the first lens group, it is possible to suitably restrain generation of a chromatic aberration, and also possible to satisfactorily correct the chromatic aberration if generated any. Moreover, in the second lens group, the fourth lens arranged on the object side has an object-side surface having negative curvature radius, and the fifth lens arranged on the image plane side has an image plane-side surface having positive curvature radius, so that it is possible to suitably correct a field curvature. Therefore, according to the imaging lens of the invention, it is possible to obtain satisfactory image-forming performance.

According to a second aspect of the invention, when the fourth lens has positive refractive power, the fifth lens has negative refractive power, the fourth lens has an Abbe's number vd4, and the fifth lens has an Abbe's number vd5, the imaging lens having the above-described configuration preferably satisfies the following conditional expressions (4) and (5):

$$20<vd4<35 \qquad (4)$$

$$20<vd5<35 \qquad (5)$$

According to the imaging lens of the invention, the second lens group is composed of two lenses having positive refractive power and negative refractive power, so that it is possible to more satisfactorily correct aberrations, especially chromatic aberration, generated in the first lens group. Generally speaking, in order to obtain a high-resolution imaging lens, it is necessary to satisfactorily correct aberrations, especially the chromatic aberration.

According to the imaging lens of the invention, with the arrangement of refractive powers of the respective lens groups from the first lens group to the third lens group, the arrangement of refractive powers and the order of Abbe's numbers of the three lenses that compose the first lens group, and the arrangement of the refractive powers and order of the Abbe's numbers of the two lenses that compose the second lens group, it is possible to more satisfactorily correct the chromatic aberration than conventional imaging lenses.

According to the imaging lens having the above-described configuration, the sixth lens and the seventh lens are preferably formed so as to have both negative refractive powers near the optical axis, and have shapes having stronger positive refractive powers as it goes to the lens peripheries.

The third lens group includes two lenses having negative refractive powers. Those two lenses have both negative refractive powers near the optical axis and have shapes having stronger positive refractive powers as it goes to the lens peripheries. For this reason, it is possible to satisfactorily correct not only an axial chromatic aberration, but also an off-axis chromatic aberration of magnification. In addition, as is well known, an imaging element such as a CCD sensor or CMOS sensor has a so-called chief ray angle (CRA) set in advance, i.e. range of an incident angle of a light beam that can be taken in the sensor. With the above-described lens shapes of the sixth lens and the seventh lens, it is possible to suitably restrain incident angles of light beams emitted from the imaging lens to the image plane within the range of CRA. As such, it is possible to suitably restrain generation of shading, a phenomenon of obtaining an image that is dark at the periphery.

Furthermore, according to a third aspect of the invention, when the sixth lens has an Abbe's number vd6 and the seventh lens has an Abbe's number vd7, the imaging lens having the above-described configuration preferably further satisfies the following conditional expressions (6) and (7):

$$40<vd6<75 \qquad (6)$$

$$40<vd7<75 \qquad (7)$$

According to a fourth aspect of the invention, when the whole lens system has a focal length f and a distance on an optical axis between the third lens and the fourth lens is D34, the imaging lens having the above-described configuration preferably satisfies the following conditional expression (8):

$$0.05<D34/f<0.2 \qquad (8)$$

When the imaging lens satisfies the conditional expression (8), it is possible to secure a back focal length while reducing the size of the imaging lens. Moreover, when the imaging lens satisfies the conditional expression (8), it is also possible to satisfactorily correct astigmatism and a field curvature. When the value exceeds the upper limit of "0.2", although it is advantageous for downsizing of the imaging lens, in the astigmatism, a tangential image surface curves to the image plane side and an astigmatic difference increases, and the image-forming surface curves to a plus direction (to the image plane side), so that it is difficult to obtain satisfactory image-forming performance. In addition, the back focal length is short, so that it is difficult to secure space to dispose an insert such as an infrared cut-off filter.

On the other hand, when the value is below the lower limit of "0.05", although it is easy to secure the back focal length, in the astigmatism, the tangential image surface curves to the object side and the astigmatic difference increases, and the image-forming surface also curves in a minus direction (to the object side). In addition, the chromatic aberration of magnification for an off-axis light beam is insufficiently corrected at image periphery (an image-forming point at a short wavelength moves in a direction to be close to the optical axis relative to an image-forming point at a reference wavelength), so that it is difficult to obtain satisfactory image-forming performance.

According to a fifth aspect of the invention, when the whole lens system has a focal length f and the first lens has a focal length f1, the imaging lens having the above-described configuration preferably satisfies the following conditional expression (9):

$$0.5<f1/f<2.0 \qquad (9)$$

When the imaging lens satisfies the conditional expression (9), it is possible to restrain a chromatic aberration, a coma aberration, and a distortion within satisfactory ranges in a balanced manner while downsizing the imaging lens. When the value exceeds the upper limit of "2.0", since the first lens has weak refractive power relative to the refractive power of the whole lens system, it is easy to secure the back focal length, but it is difficult to reduce the size of the imaging lens. In addition, inner coma aberration for off-axis light beams increases, and the distortion increases in the plus direction, so that it is difficult to obtain satisfactory image-forming performance. On the other hand, when the value is below the lower limit of "0.5", although it is advantageous for downsizing of the imaging lens, it is difficult to secure the back focal length. In addition, inner coma aberration is generated for off-axis light beams and both axial and off-axis chromatic aberrations are insufficiently corrected, so that it is difficult to obtain satisfactory image-forming performance.

According to a sixth aspect of the invention, when the first lens has a focal length f1 and the second lens has a focal length f2, the imaging lens having the above-described configuration preferably satisfies the following conditional expression (10):

$$-4 < f2/f1 < -0.5 \quad (10)$$

When the imaging lens satisfies the conditional expression (10), it is possible to restrain the astigmatism, the chromatic aberration, and the distortion within satisfactory ranges, while reducing the size of the imaging lens. When the value exceeds the upper limit of "−0.5", the second lens has strong negative refractive power relative to the positive refractive power of the first lens. Accordingly, although it is easy to secure the back focal length, it is difficult to reduce the size of the imaging lens. As for correction of aberrations, it is advantageous to correct both axial and off-axis chromatic aberrations at a short wavelength relative to those at a reference wavelength, but in the astigmatism, a sagittal image surface curves to the object side and the astigmatic difference increases. Moreover, the distortion increases in a plus direction. For this reason, it is difficult to obtain satisfactory image-forming performance.

On the other hand, when the value is below the lower limit of "−4", although it is advantageous for downsizing of the imaging lens, the axial chromatic aberration is insufficiently corrected (a focal point at a short wavelength moves to the object side relative to a focal point at a reference wavelength) and the off-axis chromatic aberration of magnification is also insufficiently corrected. In addition, the image-forming surface curves to the object side and the distortion increases in the minus direction. Therefore, also in this case, it is difficult to obtain satisfactory image-forming performance.

According to a seventh aspect of the invention, when the first lens has a focal length f1 and the third lens has a focal length f3, the imaging lens having the above-described configuration preferably satisfies the following conditional expression (11):

$$0.5 < f3/f1 < 4 \quad (11)$$

When the imaging lens satisfies the conditional expression (11), it is possible to satisfactorily correct the field curvature, the chromatic aberration, and the distortion, while reducing the size of the imaging lens. When the value exceeds the upper limit of "4", the third lens has relatively weak refractive power. Therefore, although it is advantageous for correction of the chromatic aberration at a short wavelength relative to that at a reference wavelength, the image-forming surface curves to the image plane side and the distortion increases in the plus direction, so that it is difficult to obtain satisfactory image-forming performance. In addition, it is also difficult to reduce the size of the imaging lens. On the other hand, when the value is below the lower limit of "0.5", the third lens has relatively strong refractive power. Therefore, although it is advantageous for correction of the astigmatism and the distortion, the axial chromatic aberration and the off-axis chromatic aberration of magnification are insufficiently corrected, so that it is difficult to obtain satisfactory image-forming performance. Moreover, it is difficult to secure the back focal length.

According to an eighth aspect of the invention, when a composite focal length of the fourth lens and the fifth lens is f45 and a composite focal length of the sixth lens and the seventh lens is f67, the imaging lens having the above-described configuration preferably satisfies the following conditional expression (12):

$$0.5 < f45/f67 < 5 \quad (12)$$

When the imaging lens satisfies the conditional expression (12), it is possible to restrain the field curvature, the distortion, and the chromatic aberration within satisfactory ranges in a balanced manner. When the value exceeds the upper limit of "5", although it is advantageous for correction of the axial and the off-axis chromatic aberrations at a short wavelength relative to the reference wavelength, the image-forming surface curves to the object side, and the distortion increases in the plus direction. For this reason, it is difficult to obtain satisfactory image-forming performance. On the other hand, when the value is below the lower limit of "0.5", although it is advantageous for correction of the distortion, the image-forming surface curves to the image plane side, and the astigmatic difference increases. For this reason, it is difficult to obtain satisfactory image-forming performance.

According to a ninth aspect of the invention, when the whole lens system has a focal length f, the composite focal length of the fourth lens and the fifth lens is f45, the imaging lens having the above-described configuration preferably satisfies the following conditional expression (13):

$$-7 < f45/f < -1.5 \quad (13)$$

When the imaging lens satisfies the conditional expression (13), it is possible to satisfactorily correct the chromatic aberration and the astigmatism, while securing flatness of the image-forming surface. When the value exceeds the upper limit of "−1.5", although it is advantageous for correcting the chromatic aberration, it is difficult to secure the flatness of the image-forming surface. On the other hand, when the value is below the lower limit of "−7", the astigmatic difference increases and it is difficult to secure the flatness of the image-forming surface. Moreover, it is difficult to correct the chromatic aberration and it is difficult to obtain satisfactory image-forming performance.

In order to more satisfactorily correct the chromatic aberration and the astigmatism while securing the flatness of the image-forming surface, according to a tenth aspect of the invention, the imaging lens having the above-described configuration preferably satisfies the following conditional expression (13A):

$$-5 < f45/f < -1.5 \quad (13A)$$

According to an eleventh aspect of the invention, when the fourth lens has a focal length f4 and the fifth lens has a focal length f5, the imaging lens having the above-described configuration preferably satisfies the following conditional expression (14):

$$-8 < f4/f5 < -1.5 \quad (14)$$

When the imaging lens satisfies the conditional expression (14), it is possible to restrain the field curvature, the astigmatism, the chromatic aberration, and the distortion within preferred ranges in a balanced manner. When the value exceeds the upper limit of "−1.5", the axial chromatic aberration and the off-axis chromatic aberration of magnification increase and the astigmatic difference increases, so that it is difficult to obtain satisfactory image-forming performance. On the other hand, when the value is below the lower limit of "−8", the fourth lens has weak positive refractive power relative to the negative refractive power of the fifth lens. Therefore, although it is advantageous for correcting the axial and the off-axis chromatic aberrations, the astigmatic difference for the off-axis light beams increases and the distortion increases in the plus direction, so that it is difficult to obtain satisfactory image-forming performance.

According to a twelfth aspect of the invention, when the whole lens system has a focal length f and the fourth lens has a focal length f4, the imaging lens having the above-described configuration preferably satisfies the following conditional expression (15):

$$2 < f4/f < 15 \qquad (15)$$

When the imaging lens satisfies the conditional expression (15), it is possible to satisfactorily correct the chromatic aberration and the field curvature. When the value exceeds the upper limit of "15", the fourth lens has weak refractive power relative to the refractive power of the whole lens system. Therefore, although it is advantageous for correction of the chromatic aberration of magnification for off-axis light beams, the image-forming surface curves to the object side, so that it is difficult to obtain satisfactory image-forming performance. On the other hand, when the value is below the lower limit of "2", the axial chromatic aberration and the chromatic aberration of magnification are both insufficiently corrected, and the image-forming surface curves to the image plane side, so that, also in this case, it is difficult to obtain satisfactory image-forming performance.

According to a thirteenth aspect of the invention, the imaging lens having the above-described configuration has the fifth lens, which has an object-side surface having negative curvature radius and an image plane-side surface having positive curvature radius. When the curvature radius of the object-side surface of the fifth lens is R5f and the curvature radius of the image plane-side surface of the fifth lens is R5r, the imaging lens preferably satisfies the following conditional expression (16):

$$-15 < R5f/R5r < -3 \qquad (16)$$

When the imaging lens satisfies the conditional expression (16), it is possible to satisfactorily correct the chromatic aberration of magnification and the astigmatism, while securing the flatness of the image-forming surface. When the value exceeds the upper limit of "−3", the sagittal image surface in the astigmatism curves to the object side at the periphery of the image, so that it is difficult to secure the flatness of the image-forming surface. In addition, the chromatic aberration of magnification is insufficiently corrected, so that it is difficult to obtain satisfactory image-forming performance. On the other hand, when the value is below the lower limit of "−15", although it is advantageous for correction of the chromatic aberration of magnification, the tangential image surface in the astigmatism curves to the image plane side, so that the astigmatic difference increases and it is difficult to obtain satisfactory image-forming performance.

According to a fourteenth aspect of the invention, when the whole lens system has a focal length f and the seventh lens has a focal length f7, the imaging lens preferably satisfies the following conditional expression (17):

$$-8 < f7/f < -1 \qquad (17)$$

When the imaging lens satisfies the conditional expression (17), it is possible to restrain the coma aberration, the chromatic aberration, and the distortion within preferred ranges in a balanced manner. When the value exceeds the upper limit of "−1", although it is advantageous for correction of the axial chromatic aberration, the inner coma aberration increases for the off-axis light beams and the chromatic aberration of magnification increases, so that it is difficult to obtain satisfactory image-forming performance. On the other hand, when the value is below the lower limit of "−8", although it is advantageous for correction of the chromatic aberration of magnification, outer coma aberration increases for the tangential image surface of off-axis light beams, and the distortion increases in the plus direction. For this reason, it is difficult to obtain satisfactory image-forming performance.

According to a fifteenth aspect of the invention, in order to more preferably correct the coma aberration, the chromatic aberration, and the distortion, the imaging lens having the above-described configuration preferably satisfies the following conditional expression (17A):

$$-6 < f7/f < -1 \qquad (17A)$$

According to the imaging lens of the invention, it is possible to provide a small imaging lens suitable for mounting in a small-sized camera, while having high resolution with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13 and 16 are schematic sectional views of imaging lenses in Numerical Data Examples 1 to 6 according to the embodiment, respectively. Since a basic lens configuration is the same among those Numerical Data Examples, the lens configuration of the embodiment will be described with reference to the illustrative sectional view of Numerical Data Example 1.

Figure 1:
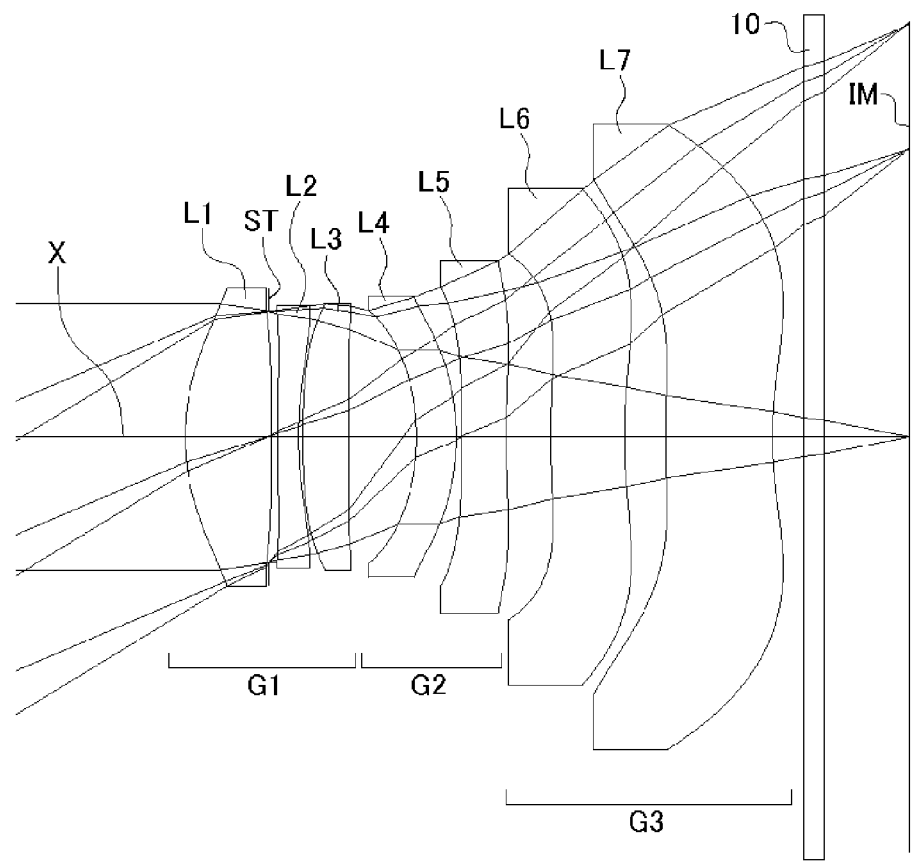
FIG. 1 shows a sectional view of a schematic configuration of an imaging lens in Numerical Data Example 1 according to an embodiment of the invention.

As shown in FIG. 1, the imaging lens of the embodiment includes a first lens group G1 having positive refractive power, a second lens group G2 having negative refractive power, and a third lens group G3 having negative refractive power, arranged in the order from an object side to an image plane side. Between the third lens group G3 and an image plane IM of an imaging element, there may be provided a filter 10. The filter 10 may be optionally omitted.

The first lens group G1 includes a first lens L1 having positive refractive power, an aperture stop ST, a second lens L2 having negative refractive power, and a third lens L3 having positive refractive power, arranged in the order from the object side. The first lens L1 is formed in a shape such that a curvature radius r1 of an object-side surface thereof is positive and a curvature radius r2 of an image plane-side surface thereof is negative, and has a shape of a biconvex lens near an optical axis X. Here, the shape of the first lens L1 is not limited to the one in Numerical Data Example 1. The shape of the first lens L1 can be any as long as the curvature radius r1 of the object-side surface thereof is positive, and can be a shape such that the curvature radius r2 of the image plane-side surface thereof is positive, i.e., a shape of a meniscus lens directing a convex surface thereof to the object side near the optical axis X.

The second lens L2 is formed in a shape such that a curvature radius r4 of an object-side surface thereof and a curvature radius r5 of an image plane-side surface thereof are both positive, and has a shape of a meniscus lens directing a convex surface thereof to the object side near the optical axis X. The shape of the second lens L2 is not limited to the one in Numerical Data Example 1. The shape of the second lens L2 can be any as long as the curvature radius r5 of the image plane-side surface thereof is positive, and can be a shape such that the curvature radius r4 of the object-side surface thereof is negative, i.e., a shape of a biconcave lens near the optical axis X.

The third lens L3 is formed in a shape such that a curvature radius r6 of an object-side surface thereof is positive and a curvature radius r7 of an image plane-side surface thereof is negative, and has a shape of a biconvex lens near the optical axis X.

The second lens group G2 includes a fourth lens L4 having positive refractive power, and a fifth lens L5 having negative refractive power, arranged in the order from the object side. Among them, the fourth lens L4 is formed in a shape such that a curvature radius r8 of an object-side surface thereof and a curvature radius r9 of an image plane-side surface thereof are both negative, and has a shape of a meniscus lens directing a concave surface thereof to the object side near the optical axis X.

The fifth lens L5 is formed in a shape such that a curvature radius r10 of an object-side surface thereof is negative and a curvature radius r11 of an image plane-side surface thereof is positive, and has a shape of a biconcave lens near the optical axis X. Here, the shape of the fifth lens L5 is not limited to the one in Numerical Data Example 1. The shape of the fifth lens L5 can be any as long as the curvature radius r11 of the image plane-side surface thereof is positive. The shape of the fifth lens L5 can be formed in a shape such that the curvature radius r10 of the object-side surface thereof is positive, i.e., a shape of a meniscus lens directing a convex surface thereof to the object side near the optical axis X.

The third lens group G3 includes a sixth lens L6 having negative refractive power and a seventh lens L7 having negative refractive power, arranged in the order from the object side. The sixth lens L6 is formed in a shape such that a curvature radius r12 of an object-side surface thereof and a curvature radius r13 of an image plane-side surface thereof are both positive, and has a shape of a meniscus lens directing a convex surface thereof to the object side near the optical axis X. The seventh lens L7 is formed in a shape such that a curvature radius r14 of an object-side surface thereof and a curvature radius r15 of an image plane-side surface thereof are both positive, and has a shape of a meniscus lens directing a convex surface thereof to the object side near the optical axis X.

Furthermore, in each of the sixth lens L6 and the seventh lens L7, the object-side surface thereof and the image plane-side surface thereof are formed as aspheric shapes having inflexion points. More specifically, each of the sixth lens L6 and the seventh lens L7 is formed in a shape so as to have negative refractive power near the optical axis X and have stronger positive refractive power as it goes to the lens periphery. With those shapes of the sixth lens L6 and the seventh lens L7, it is possible to satisfactorily correct axial chromatic aberration as well as off-axis chromatic aberration of magnification. In addition, it is also possible to suitably restrain incident angles of light beams emitted from the imaging lens to the image plane IM within the range of chief ray angle (CRA).

Here, according to the embodiment, the sixth lens L6 and the seventh lens L7 have their both object-side surfaces and image plane-side surfaces formed as aspheric shapes having inflexion points. However, it is not necessary to form both of those surfaces as aspheric shapes having inflexion points. Even when each of those lenses has an aspheric surface having an inflexion point only on one side surface, it is still possible to form both or one of those lenses in shapes so as to have negative refractive power near the optical axis X and have strong positive refractive power as it goes to the lens peripheries thereof. In addition, depending on required optical performances and degree of downsizing of the imaging lens, it is not always necessary to provide an inflexion point in the sixth lens L6 and the seventh lens L7.

The imaging lens of the embodiment satisfies the following conditional expressions (1) to (17):

$$40<vd1<75 \qquad (1)$$

$$20<vd2<35 \qquad (2)$$

$$40<vd3<75 \qquad (3)$$

$$20<vd4<35 \qquad (4)$$

$$20<vd5<35 \qquad (5)$$

$$40<vd6<75 \qquad (6)$$

$40 < vd7 < 75$           (7)

$0.05 < D34/f < 0.2$           (8)

$0.5 < f1/f < 2.0$           (9)

$-4 < f2/f1 < -0.5$           (10)

$0.5 < f3/f1 < 4$           (11)

$0.5 < f45/f67 < 5$           (12)

$-7 < f45/f < -1.5$           (13)

$-8 < f4/f5 < -1.5$           (14)

$2 < f4/f < 15$           (15)

$-15 < R5f/R5r < -3$           (16)

$-8 < f7/f < -1$           (17)

In the above conditional expressions:
vd1: Abbe's number of a first lens L1
vd2: Abbe's number of a second lens L2
vd3: Abbe's number of a third lens L3
vd4: Abbe's number of a fourth lens L4
vd5: Abbe's number of a fifth lens L5
vd6: Abbe's number of a sixth lens L6
vd7: Abbe's number of a seventh lens L7
f: Focal length of the whole lens system
f1: Focal length of the first lens L1
f2: Focal length of the second lens L2
f3: Focal length of the third lens L3
f4: Focal length of the fourth lens L4
f5: Focal length of the fifth lens L5
f7: Focal length of the seventh lens L7
f45: Composite focal length of the fourth lens L4 and the fifth lens L5
f67: Composite focal length of the sixth lens L6 and the seventh lens L7
D34: Distance on an optical axis X between the third lens L3 and the fourth lens L4
R5f: Curvature radius of an object-side surface of the fifth lens L5
R5r: Curvature radius of an image plane-side surface of the fifth lens L5

The imaging lens of the embodiment satisfies the following conditional expressions (13A) and (17A) to further satisfactorily correct the aberrations:

$-5 < f45/f < -1.5$           (13A)

$-6 < f7/f < -1$           (17A)

Here, it is not necessary to satisfy all of the conditional expressions, and it is achievable to obtain an effect corresponding to the respective conditional expressions when any single one of the conditional expressions is individually satisfied.

In the embodiment, all lens surfaces of the respective lenses are formed as aspheric surfaces. When the aspheric surfaces applied to the lens surfaces have an axis Z in a direction of the optical axis X, a height H in a direction perpendicular to the optical axis X, a conical coefficient k, and aspheric coefficients $A_4, A_6, A_8, A_{10}, A_{12}, A_{14},$ and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ [Formula 1]

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance on the optical axis between lens surfaces (surface spacing), nd represents a refractive index for a d line (a reference wavelength), and vd represents an Abbe's number for the d line, respectively. Here, aspheric surfaces are indicated with surface numbers i affixed with * (asterisk).

NUMERICAL DATA EXAMPLE 1

Basic data are shown below.

f = 9.57 mm, Fno = 2.4, ω = 32.1°
Unit: mm

Surface Data

| Surface Number i | r | d | nd | vd |
|---|---|---|---|---|
| (Object) | ∞ | ∞ | | |
| 1* | 3.318 | 1.213 | 1.5346 | 56.1 (=vd1) |
| 2* | −39.261 | −0.025 | | |
| 3 | ∞ | 0.116 | | |
| (Stop) | | | | |
| 4* | 33.984 | 0.298 | 1.6355 | 24.0 (=vd2) |
| 5* | 6.127 | 0.059 | | |
| 6* | 10.639 | 0.655 | 1.5346 | 56.1 (=vd3) |
| 7* | −62.349 | 0.949 (D34) | | |
| 8* | −3.442 | 0.562 | 1.6355 | 24.0 (=vd4) |
| 9* | −3.467 | 0.098 | | |
| 10* | −42.006 (=R5f) | 0.647 | 1.6355 | 24.0 (=vd5) |
| 11* | 13.772 (=R5r) | 0.571 | | |
| 12* | 9.539 | 1.099 | 1.5346 | 56.1 (=vd6) |
| 13* | 6.640 | 0.526 | | |
| 14* | 12.045 | 1.544 | 1.5346 | 56.1 (=vd7) |
| 15* | 4.642 | 0.440 | | |
| 16 | ∞ | 0.300 | 1.5168 | 64.2 |
| 17 | ∞ | 1.063 | | |
| (Image plane) | ∞ | | | |

Aspheric Surface Data

First Surface k = 0.000, $A_4$ = −2.995E−03, $A_6$ = −1.855E−04, $A_8$ = −2.472E−04,
$A_{10}$ = −3.907E−06, $A_{12}$ = −5.270E−07, $A_{14}$ = 2.761E−07,
$A_{16}$ = −1.217E−09

Second Surface k = 0.000, $A_4$ = 1.174E−02, $A_6$ = −1.391E−02, $A_8$ = 5.212E−03, $A_{10}$ = −9.563E−04, $A_{12}$ = 7.839E−05, $A_{14}$ = −2.213E−06, $A_{16}$ = 5.641E−08

-continued f = 9.57 mm, Fno = 2.4, ω = 32.1°
Unit: mm

Fourth Surface k = 0.000, $A_4$ = 1.333E–02, $A_6$ = –2.008E–02, $A_8$ = 7.838E–03, $A_{10}$ = –1.302E–03, $A_{12}$ = 7.691E–05, $A_{14}$ = 5.904E–07, $A_{16}$ = –5.003E–07
Fifth Surface k = 0.000, $A_4$ = 6.851E–03, $A_6$ = –1.313E–02, $A_8$ = 3.616E–03, $A_{10}$ = –2.531E–04, $A_{12}$ = –2.370E–05, $A_{14}$ = –1.000E–05, $A_{16}$ = 1.564E–06
Sixth Surface k = 0.000, $A_4$ = 1.103E–02, $A_6$ = –2.591E–03, $A_8$ = 1.170E–03, $A_{10}$ = –4.329E–05, $A_{12}$ = –5.911E–06, $A_{14}$ = 2.463E–06, $A_{16}$ = –1.368E–06
Seventh Surface k = 0.000, $A_4$ = –1.065E–03, $A_6$ = 2.211E–03, $A_8$ = 8.593E–04, $A_{10}$ = –4.613E–04, $A_{12}$ = 7.895E–05, $A_{14}$ = 7.220E–06, $A_{16}$ = –5.043E–06
Eighth Surface k = 0.000, $A_4$ = –1.547E–02, $A_6$ = 2.513E–03, $A_8$ = –2.149E–05, $A_{10}$ = –2.485E–04, $A_{12}$ = –1.856E–05, $A_{14}$ = 1.073E–07, $A_{16}$ = 1.527E–06
Ninth Surface k = 0.000, $A_4$ = –6.920E–03, $A_6$ = 1.871E–03, $A_8$ = 8.894E–05, $A_{10}$ = 1.388E–06, $A_{12}$ = –2.970E–05, $A_{14}$ = –1.020E–06, $A_{16}$ = 2.309E–06
Tenth Surface k = 0.000, $A_4$ = –8.230E–03, $A_6$ = –9.253E–04, $A_8$ = –7.779E–06, $A_{10}$ = 6.194E–06, $A_{12}$ = –1.505E–06, $A_{14}$ = 5.207E–07, $A_{16}$ = –3.481E–08
Eleventh Surface k = 0.000, $A_4$ = –1.020E–02, $A_6$ = –6.061E–04, $A_8$ = 1.202E–04, $A_{10}$ = 1.683E–06, $A_{12}$ = 1.154E–07, $A_{14}$ = –4.525E–08, $A_{16}$ = 7.646E–11
Twelfth Surface k = 0.000, $A_4$ = –1.374E–02, $A_6$ = –3.962E–04, $A_8$ = –3.784E–05, $A_{10}$ = –2.372E–06, $A_{12}$ = 1.515E–07, $A_{14}$ = 2.223E–08, $A_{16}$ = –2.404E–09
Thirteenth Surface k = 0.000, $A_4$ = –1.172E–02, $A_6$ = 2.665E–05, $A_8$ = 2.272E–05, $A_{10}$ = –1.026E–06, $A_{12}$ = –5.260E–09, $A_{14}$ = 1.463E–09, $A_{16}$ = –2.585E–11
Fourteenth Surface k = 0.000, $A_4$ = –2.216E–02, $A_6$ = 1.317E–03, $A_8$ = –2.194E–05, $A_{10}$ = –2.470E–07, $A_{12}$ = 6.753E–10, $A_{14}$ = 1.105E–10, $A_{16}$ = 1.524E–11
Fifteenth Surface k = –1.551E+01, $A_4$ = –9.918E–03, $A_6$ = 3.875E–04, $A_8$ = –1.268E–05, $A_{10}$ = 1.234E–07, $A_{12}$ = 9.762E–09, $A_{14}$ = –5.202E–10, $A_{16}$ = 6.871E–12 f1 = 5.78 mm
f2 = –11.81 mm
f3 = 17.05 mm
f4 = 97.25 mm
f5 = –16.25 mm
f6 = –47.08 mm
f7 = –15.23 mm
f45 = –18.21 mm
f67 = –11.44 mm

The values of the respective conditional expressions are as follows:
D34/f=0.10
f1/f=0.60
f2/f1=–2.04
f3/f1=2.95
f4/f=10.16
f7/f=–1.59
f45/f=–1.90
f45/f67=1.59
f4/f5=–5.99
R5f/R5r=–3.05

Accordingly, the imaging lens of Numerical Data Example 1 satisfies the above-described conditional expressions. The distance on the optical axis X from the object-side surface of the first lens L1 to the image plane IM (length in air for the filter 10) is 10.01 mm, and downsizing of the imaging lens is attained.

Figure 2:
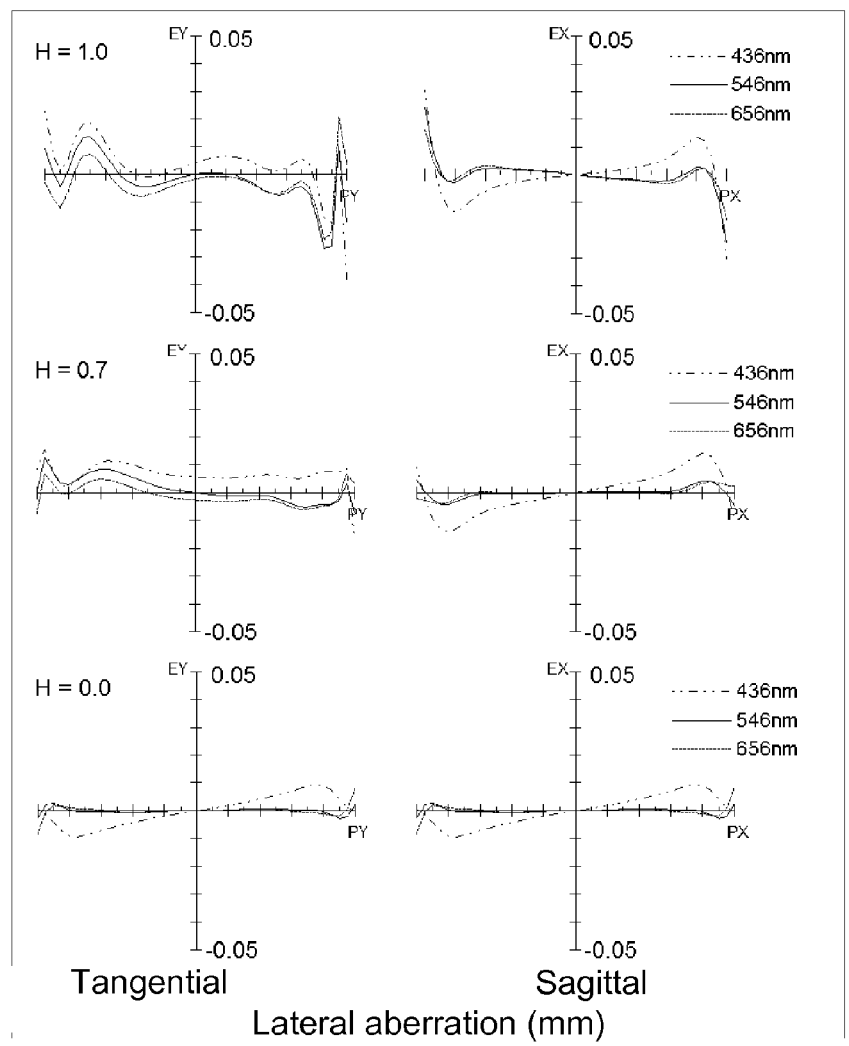
FIG. 2 is an aberration diagram showing a lateral aberration of the imaging lens of FIG. 1.
Figure 3:
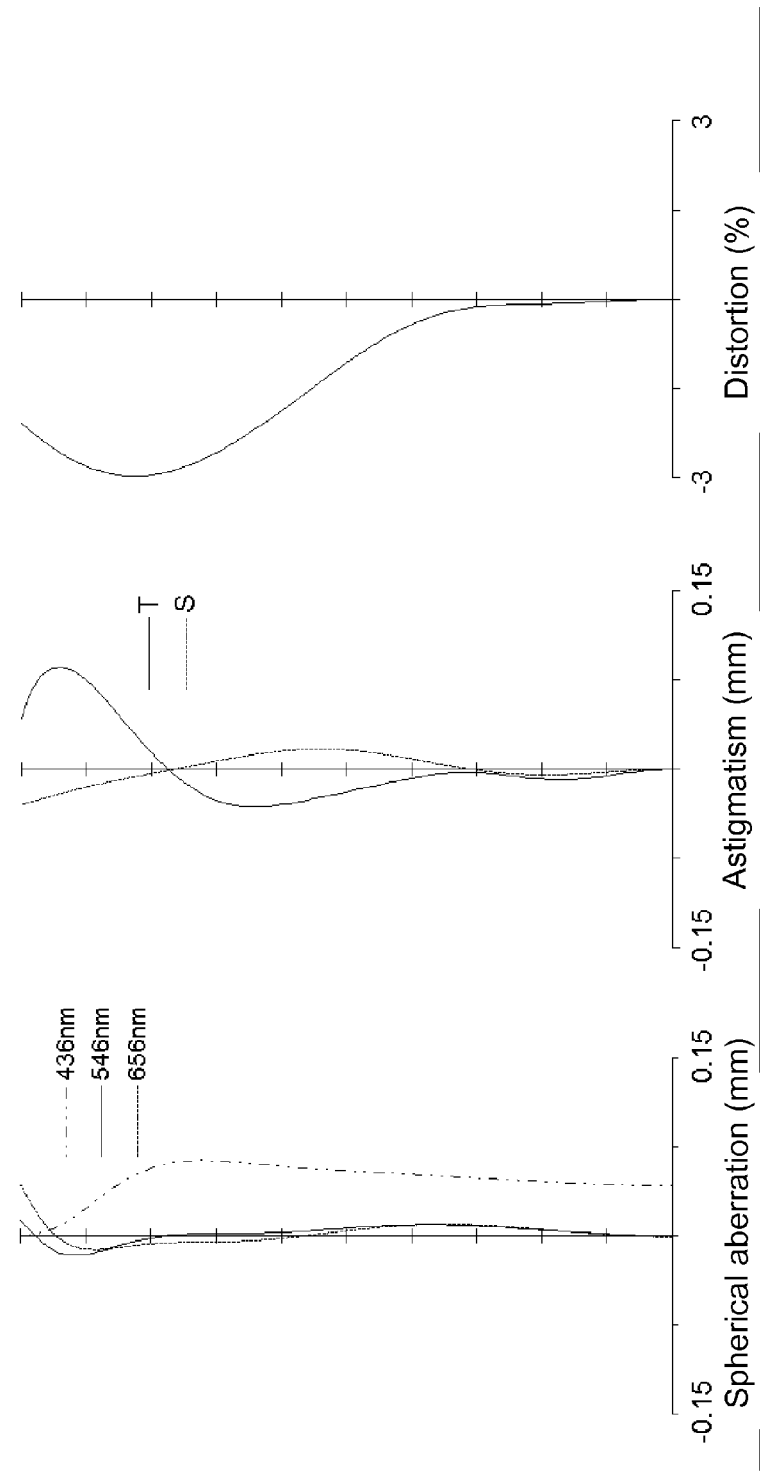
FIG. 3 is an aberration diagram showing a spherical aberration, astigmatism, and a distortion of the imaging lens of FIG. 1.
Figure 4:
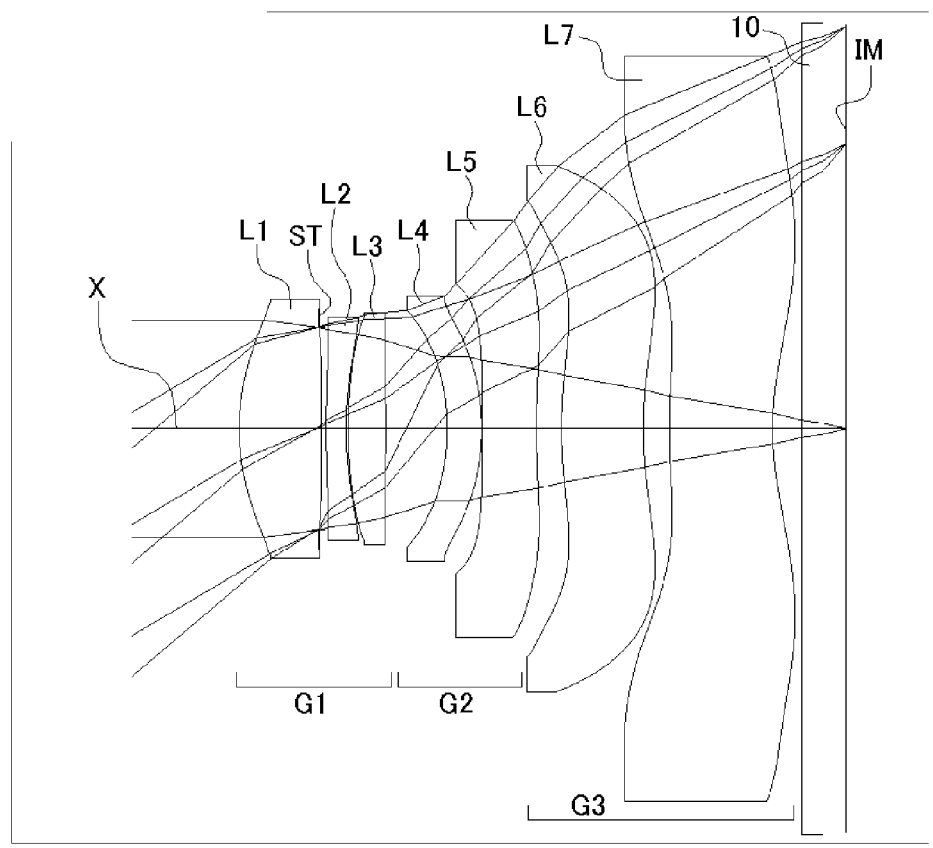
FIG. 4 shows a sectional view of a schematic configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, 14, and 17). Furthermore, FIG. 3 shows a spherical aberration (mm), astigmatism (mm), and a distortion (%), respectively in the imaging lens of Numerical Data Example 1. In the aberration diagrams, for the lateral aberration diagrams and spherical aberration diagrams, aberrations at each wavelength, i.e. a g line (436 nm), an e line (546 nm), and a C line (656 nm) are indicated. In the astigmatism diagrams, an aberration on a sagittal image surface S and an aberration on a tangential image surface T are respectively indicated (which are the same in FIGS. 6, 9, 12, 15, and 18). As shown in FIGS. 2 and 3, according to the imaging lens of Numerical Data Example 1, the aberrations are satisfactorily corrected.

NUMERICAL DATA EXAMPLE 2

Basic data are shown below.

f = 7.06 mm, Fno = 2.1, ω = 40.4°
Unit: mm

Surface Data

| Surface Number i | r | d | nd | νd |
|---|---|---|---|---|
| (Object) | ∞ | ∞ | | |
| 1* | 3.376 | 1.222 | 1.5346 | 56.1 (=νd1) |
| 2* | –42.517 | –0.050 | | |
| 3 (Stop) | ∞ | 0.113 | | |
| 4* | 22.600 | 0.300 | 1.6355 | 24.0 (=νd2) |
| 5* | 5.867 | 0.030 | | |
| 6* | 9.704 | 0.550 | 1.5346 | 56.1 (=νd3) |
| 7* | –49.191 | 0.902 (D34) | | |
| 8* | –3.593 | 0.513 | 1.6355 | 24.0 (=νd4) |
| 9* | –3.349 | 0.009 | | |
| 10* | –140.096 (=R5f) | 0.797 | 1.6355 | 24.0 (=νd5) |
| 11* | 12.288 (=R5r) | 0.370 | | |
| 12* | 6.574 | 1.204 | 1.5346 | 56.1 (=νd6) |
| 13* | 5.977 | 0.384 | | |
| 14* | 9.315 | 1.525 | 1.5346 | 56.1 (=νd7) |
| 15* | 4.593 | 0.440 | | |
| 16 | ∞ | 0.300 | 1.5168 | 64.2 |
| 17 | ∞ | 0.345 | | |
| (Image plane) | ∞ | | | |

Aspheric Surface Data

First Surface k = 0.000, $A_4$ = –3.965E–03, $A_6$ = –3.163E–04, $A_8$ = –2.704E–04, $A_{10}$ = –8.336E–06, $A_{12}$ = –1.271E–06, $A_{14}$ = 1.969E–07, $A_{16}$ = 5.583E–08
Second Surface k = 0.000, $A_4$ = 1.203E–02, $A_6$ = –1.415E–02, $A_8$ = 5.161E–03, $A_{10}$ = –9.595E–04, $A_{12}$ = 8.081E–05, $A_{14}$ = –1.836E–06, $A_{16}$ = –4.840E–07

-continued $f = 7.06$ mm, Fno = 2.1, $\omega = 40.4°$
Unit: mm

Fourth Surface $k = 0.000, A_4 = 1.365E-02, A_6 = -1.977E-02, A_8 = 7.890E-03, A_{10} = -1.308E-03, A_{12} = 6.801E-05, A_{14} = -2.846E-06, A_{16} = -1.083E-07$
Fifth Surface $k = 0.000, A_4 = 7.248E-03, A_6 = -1.265E-02, A_8 = 3.664E-03, A_{10} = -2.756E-04, A_{12} = -3.387E-05, A_{14} = -1.169E-05, A_{16} = 9.552E-07$
Sixth Surface $k = 0.000, A_4 = 1.236E-02, A_6 = -2.626E-03, A_8 = 1.167E-03, A_{10} = -4.452E-05, A_{12} = -1.290E-05, A_{14} = -1.228E-06, A_{16} = -1.707E-06$
Seventh Surface $k = 0.000, A_4 = -1.956E-03, A_6 = 2.108E-03, A_8 = 7.792E-04, A_{10} = -5.058E-04, A_{12} = 6.916E-05, A_{14} = 7.074E-06, A_{16} = -4.781E-06$
Eighth Surface $k = 0.000, A_4 = -1.579E-02, A_6 = 1.663E-03, A_8 = 7.286E-05, A_{10} = -1.883E-04, A_{12} = -1.452E-06, A_{14} = 2.090E-06, A_{16} = 5.824E-07$
Ninth Surface $k = 0.000, A_4 = -7.842E-03, A_6 = 1.896E-03, A_8 = 1.180E-04, A_{10} = 1.366E-05, A_{12} = -2.640E-05, A_{14} = 2.516E-07, A_{16} = 2.843E-06$
Tenth Surface $k = 0.000, A_4 = -6.684E-03, A_6 = -1.414E-03, A_8 = -7.300E-05, A_{10} = -1.783E-06, A_{12} = -1.157E-06, A_{14} = 4.678E-07, A_{16} = -3.611E-07$
Eleventh Surface $k = 0.000, A_4 = -9.334E-03, A_6 = -7.328E-04, A_8 = 1.127E-04, A_{10} = 1.688E-06, A_{12} = 1.388E-07, A_{14} = -4.840E-08, A_{16} = -1.301E-09$
Twelfth Surface $k = 0.000, A_4 = -1.284E-02, A_6 = -3.041E-04, A_8 = -3.322E-06, A_{10} = 1.745E-06, A_{12} = 4.153E-07, A_{14} = 2.627E-08, A_{16} = -4.103E-09$
Thirteenth Surface $k = 0.000, A_4 = -1.036E-02, A_6 = -4.358E-05, A_8 = 2.821E-07, A_{10} = -4.786E-07, A_{12} = 3.614E-08, A_{14} = 1.008E-09, A_{16} = -1.640E-10$
Fourteenth Surface $k = 0.000, A_4 = -1.983E-02, A_6 = 1.289E-03, A_8 = -2.257E-05, A_{10} = -2.681E-07, A_{12} = -5.283E-10, A_{14} = 3.760E-11, A_{16} = 1.055E-11$
Fifteenth Surface $k = -4.229, A_4 = -8.594E-03, A_6 = 4.390E-04, A_8 = -1.275E-05, A_{10} = 1.463E-07, A_{12} = 1.051E-08, A_{14} = -5.125E-10, A_{16} = 6.372E-12$ f1 = 5.91 mm
f2 = -12.56 mm
f3 = 15.21 mm
f4 = 42.80 mm
f5 = -17.74 mm
f6 = -415.47 mm
f7 = -19.10 mm
f45 = -28.14 mm
f67 = -19.32 mm The values of the respective conditional expressions are as follows:
D34/f=0.13
f1/f=0.84
f2/f1=-2.13
f3/f1=2.58
f4/f=6.07
f7/f=-2.71
f45/f=-3.99
f45/f67=1.46
f4/f5=-2.41
R5f/R5r=-11.40

Accordingly, the imaging lens of Numerical Data Example 2 satisfies the above-described conditional expressions. The distance on the optical axis X from the object-side surface of the first lens L1 to the image plane IM (length in air for the filter 10) is 8.85 mm, and downsizing of the imaging lens is attained.

Figure 5:
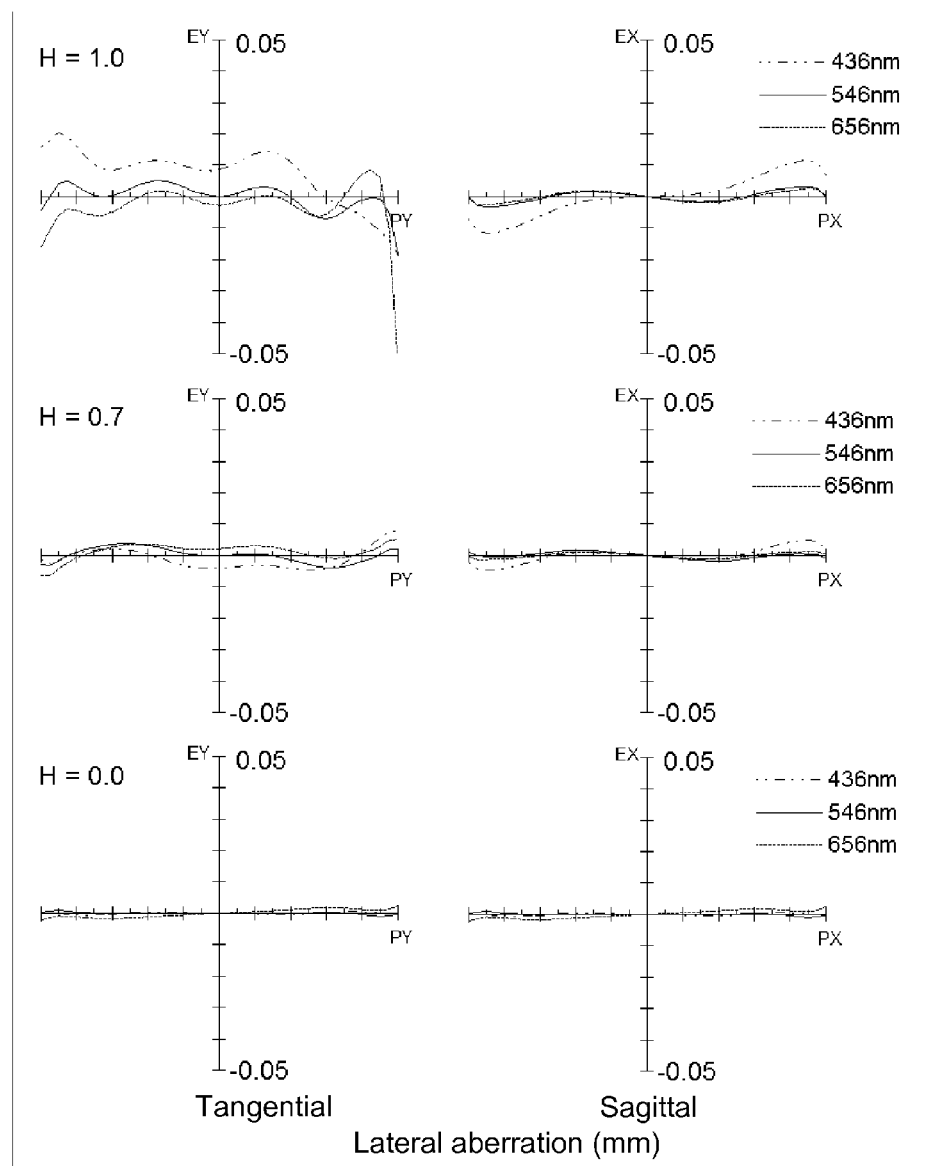
FIG. 5 is an aberration diagram showing a lateral aberration of the imaging lens of FIG. 4.
Figure 6:
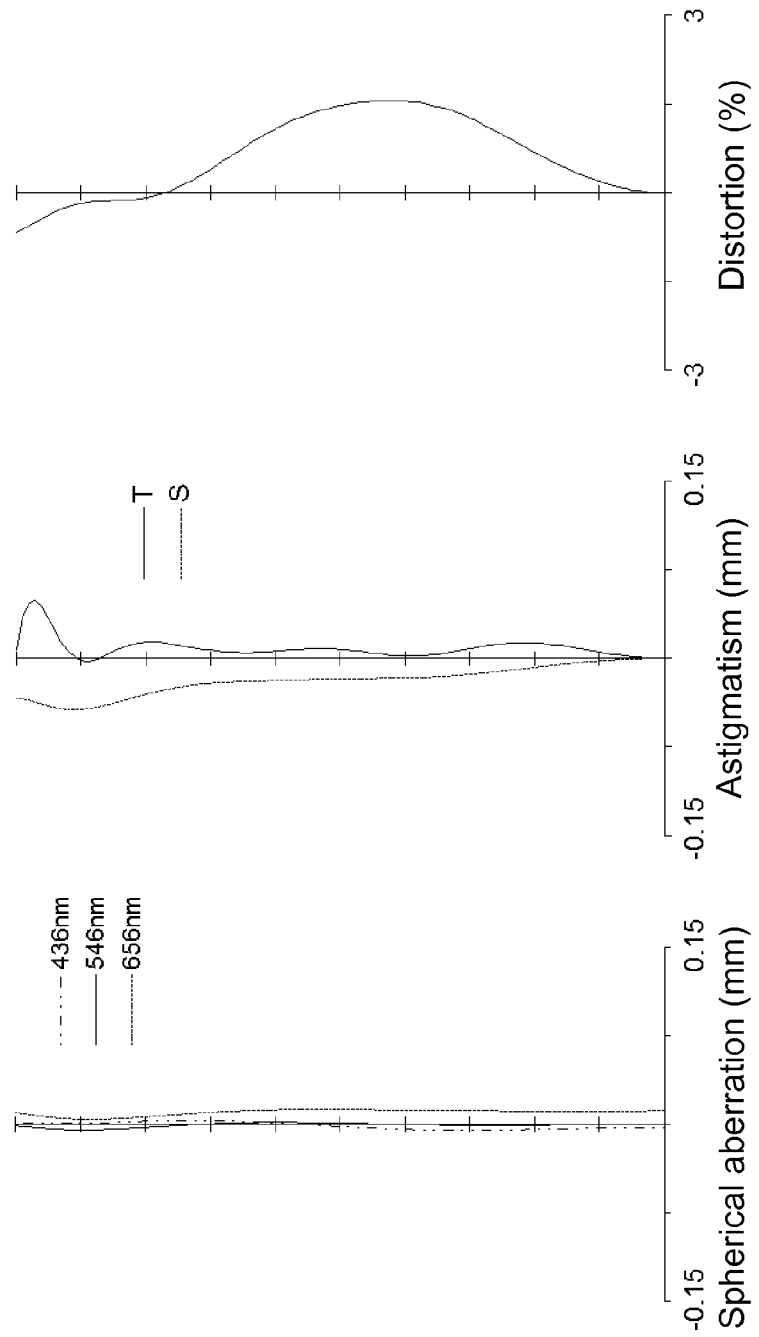
FIG. 6 is an aberration diagram showing a spherical aberration, astigmatism, and a distortion of the imaging lens of FIG. 4.
Figure 7:
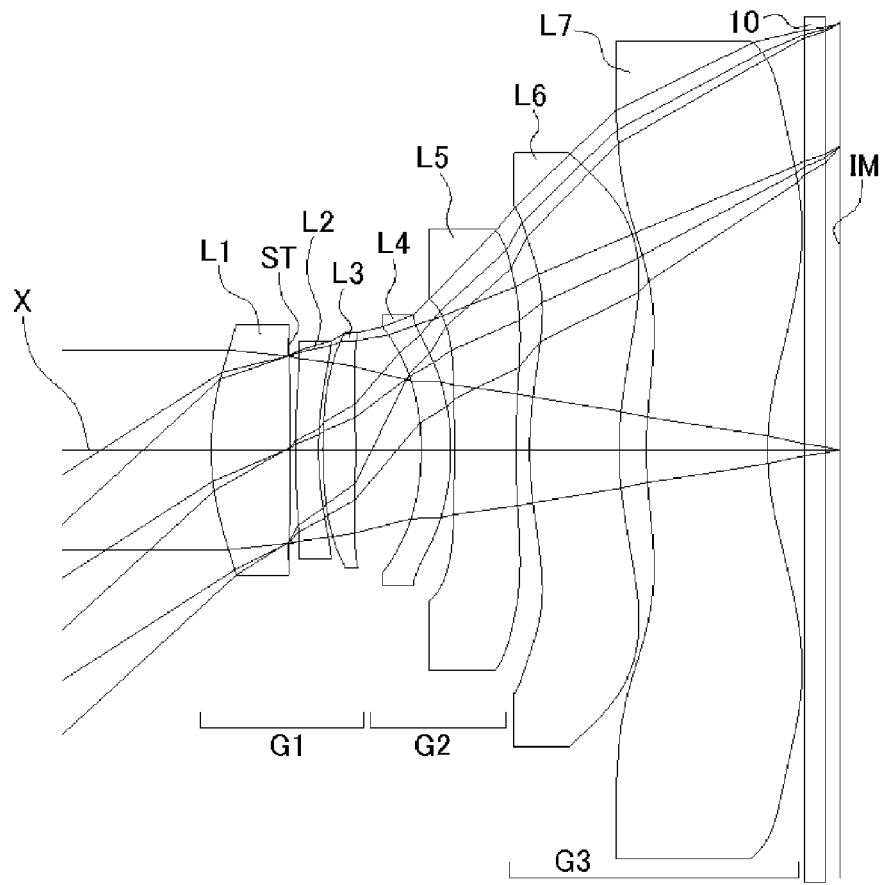
FIG. 7 shows a sectional view of a schematic configuration of an imaging lens in Numerical Data Example 3 according to the embodiment of the invention.

FIG. 5 shows the lateral aberration that corresponds to the image height ratio H, and FIG. 6 shows a spherical aberration (mm), astigmatism (mm), and a distortion (%), respectively, of the imaging lens in Numerical Data Example 2. As shown in FIGS. 5 and 6, also according to the imaging lens of Numerical Data Example 2, the aberrations are satisfactorily corrected.

NUMERICAL DATA EXAMPLE 3

Basic data are shown below.

$f = 6.53$ mm, Fno = 2.3, $\omega = 42.6°$
Unit: mm

Surface Data

| Surface Number i | r | d | nd | vd |
|---|---|---|---|---|
| (Object) | ∞ | ∞ | | |
| 1* | 3.747 | 1.096 | 1.5346 | 56.1 (=vd1) |
| 2* | -48.045 | -0.033 | | |
| 3 (Stop) | ∞ | 0.103 | | |
| 4* | 12.736 | 0.319 | 1.6355 | 24.0 (=vd2) |
| 5* | 5.015 | 0.064 | | |
| 6* | 7.630 | 0.448 | 1.5346 | 56.1 (=vd3) |
| 7* | -38.331 | 0.913 (D34) | | |
| 8* | -3.541 | 0.410 | 1.6355 | 24.0 (=vd4) |
| 9* | -3.373 | 0.048 | | |
| 10* | -174.656 (=R5f) | 0.853 | 1.6355 | 24.0 (=vd5) |
| 11* | 11.683 (=R5r) | 0.192 | | |
| 12* | 5.520 | 1.236 | 1.5346 | 56.1 (=vd6) |
| 13* | 5.007 | 0.379 | | |
| 14* | 5.697 | 1.681 | 1.5346 | 56.1 (=vd7) |
| 15* | 3.800 | 0.500 | | |
| 16 | ∞ | 0.300 | 1.5168 | 64.2 |
| 17 | ∞ | 0.199 | | |
| (Image plane) | ∞ | | | |

Aspheric Surface Data

First Surface $k = 0.000, A_4 = -4.897E-03, A_6 = -6.882E-04, A_8 = -2.528E-04, A_{10} = 1.272E-05, A_{12} = 7.916E-07, A_{14} = -7.723E-07, A_{16} = -1.108E-07$
Second Surface $k = 0.000, A_4 = 1.231E-02, A_6 = -1.421E-02, A_8 = 5.376E-03, A_{10} = -1.049E-03, A_{12} = 9.008E-05, A_{14} = -2.426E-05, A_{16} = -3.424E-07$
Fourth Surface $k = 0.000, A_4 = 1.223E-02, A_6 = -1.934E-02, A_8 = 8.101E-03, A_{10} = -1.519E-03, A_{12} = 2.061E-05, A_{14} = -2.114E-05, A_{16} = 3.333E-06$
Fifth Surface $k = 0.000, A_4 = 6.110E-03, A_6 = -1.198E-02, A_8 = 3.663E-03, A_{10} = -4.140E-04, A_{12} = -1.961E-04, A_{14} = 1.129E-05, A_{16} = 2.827E-06$
Sixth Surface $k = 0.000, A_4 = 1.789E-02, A_6 = -2.105E-03, A_8 = 1.206E-03, A_{10} = -8.461E-05, A_{12} = 8.494E-06, A_{14} = -5.253E-08, A_{16} = -2.102E-06$ -continued f = 6.53 mm, Fno = 2.3, ω = 42.6°
Unit: mm Seventh Surface k = 0.000, $A_4$ = 9.372E−04, $A_6$ = 1.895E−03, $A_8$ = 8.351E−04, $A_{10}$ = −4.931E−04, $A_{12}$ = 1.468E−04, $A_{14}$ = 4.910E−05, $A_{16}$ = −2.035E−05
Eighth Surface k = 0.000, $A_4$ = −1.456E−02, $A_6$ = 1.261E−03, $A_8$ = 8.563E−05, $A_{10}$ = −1.452E−04, $A_{12}$ = 5.646E−06, $A_{14}$ = 6.631E−06, $A_{16}$ = 5.902E−07
Ninth Surface k = 0.000, $A_4$ = −1.100E−02, $A_6$ = 1.780E−03, $A_8$ = 2.576E−04, $A_{10}$ = 3.745E−05, $A_{12}$ = −2.163E−05, $A_{14}$ = 3.806E−06, $A_{16}$ = 3.019E−06
Tenth Surface k = 0.000, $A_4$ = −7.203E−03, $A_6$ = −9.866E−04, $A_8$ = −2.549E−04, $A_{10}$ = 1.481E−05, $A_{12}$ = 2.102E−06, $A_{14}$ = 1.421E−06, $A_{16}$ = −7.331E−07
Eleventh Surface k = 0.000, $A_4$ = −5.885E−03, $A_6$ = −1.203E−03, $A_8$ = 1.088E−04, $A_{10}$ = 3.387E−06, $A_{12}$ = 3.204E−07, $A_{14}$ = −4.440E−08, $A_{16}$ = −3.595E−09
Twelfth Surface k = 0.000, $A_4$ = −1.182E−02, $A_6$ = −2.329E−04, $A_8$ = −1.016E−05, $A_{10}$ = 1.296E−06, $A_{12}$ = 4.016E−07, $A_{14}$ = 2.805E−08, $A_{16}$ = −4.028E−09
Thirteenth Surface k = 0.000, $A_4$ = −1.028E−02, $A_6$ = 2.672E−05, $A_8$ = 2.750E−07, $A_{10}$ = 1.701E−07, $A_{12}$ = −4.949E−08, $A_{14}$ = 2.449E−09, $A_{16}$ = −1.387E−11
Fourteenth Surface k = 0.000, $A_4$ = −2.193E−02, $A_6$ = 1.281E−03, $A_8$ = −2.166E−05, $A_{10}$ = −2.434E−07, $A_{12}$ = −3.365E−10, $A_{14}$ = 1.103E−11, $A_{16}$ = 7.932E−12
Fifteenth Surface k = −4.029, $A_4$ = −6.845E−03, $A_6$ = 2.887E−04, $A_8$ = −1.088E−05, $A_{10}$ = 2.093E−07, $A_{12}$ = 1.102E−08, $A_{14}$ = −5.572E−10, $A_{16}$ = 6.186E−12 f1 = 6.55 mm
f2 = −13.23 mm
f3 = 11.94 mm
f4 = 57.35 mm
f5 = −17.20 mm
f6 = −625.60 mm
f7 = −30.89 mm
f45 = −23.38 mm
f67 = −31.53 mm

The values of the respective conditional expressions are as follows:
D34/f=0.14
f1/f=1.00
f2/f1=31 2.02
f3/f1=1.82
f4/f=8.78
f7/f=−4.73
f45/f=−3.58
f45/f67=0.74
f4/f5=−3.33
R5f/R5r=−14.95

Accordingly, the imaging lens of Numerical Data Example 3 satisfies the above-described conditional expressions. The distance on the optical axis X from the object-side surface of the first lens L1 to the image plane IM (length in air for the filter 10) is 8.61 mm, and downsizing of the imaging lens is attained.

Figure 8:
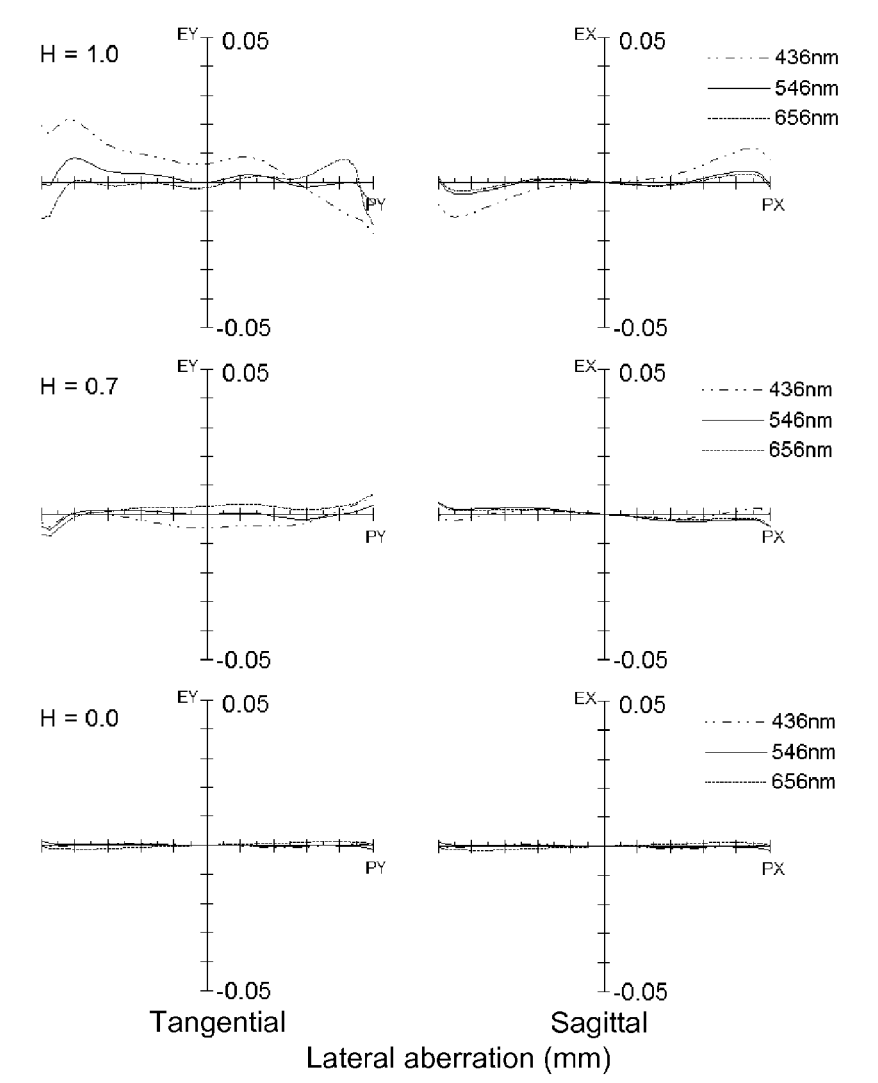
FIG. 8 is an aberration diagram showing a lateral aberration of the imaging lens of FIG. 7.
Figure 9:
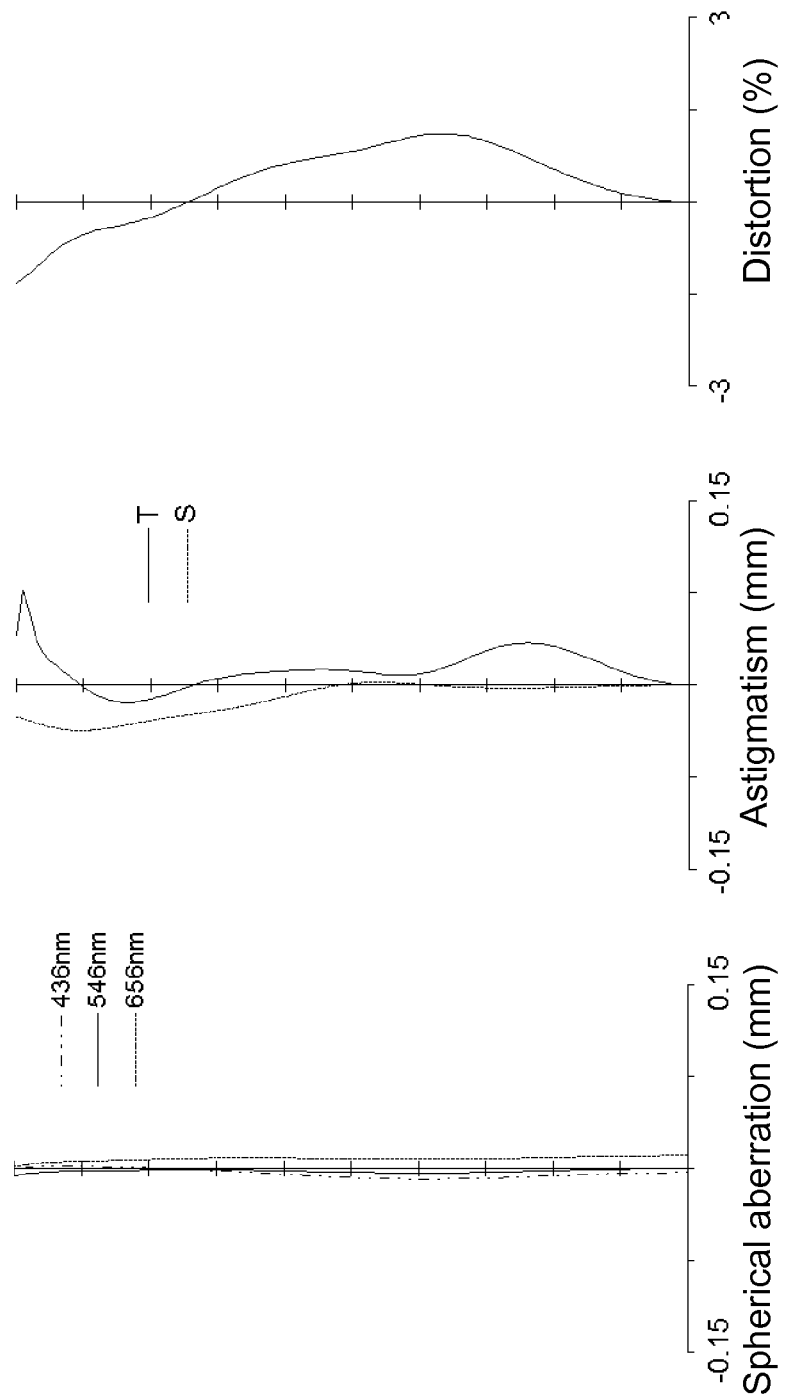
FIG. 9 is an aberration diagram showing a spherical aberration, astigmatism, and a distortion of the imaging lens of FIG. 7.
Figure 10:
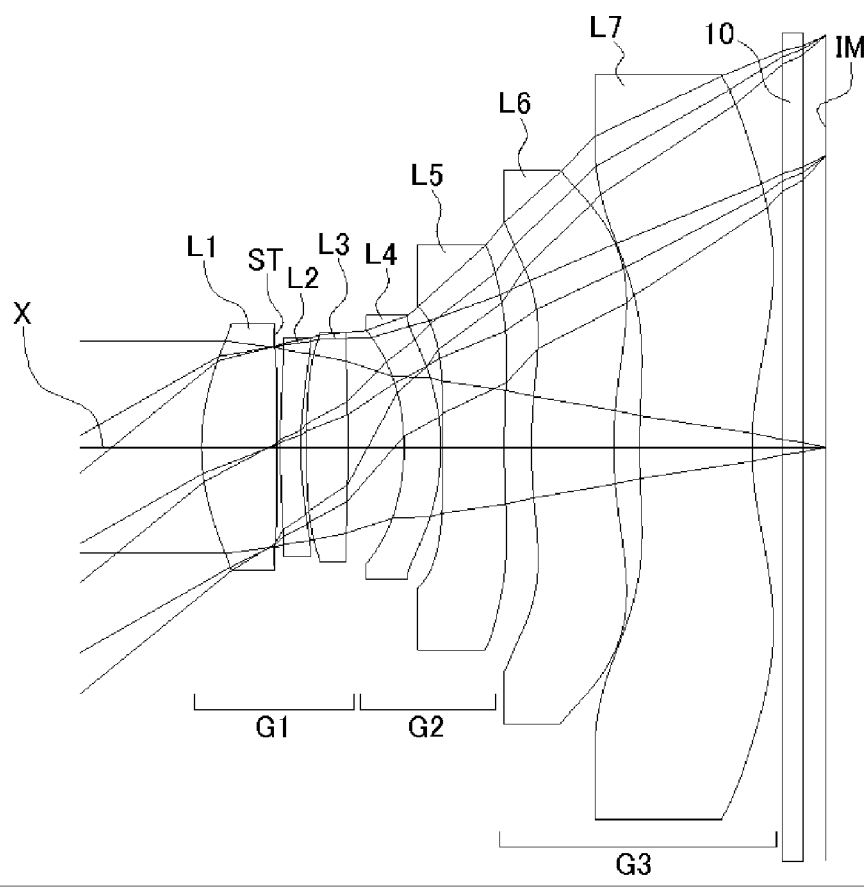
FIG. 10 shows a sectional view of a schematic configuration of an imaging lens in Numerical Data Example 4 according to the embodiment of the invention.

FIG. 8 shows the lateral aberration that corresponds to the image height ratio H, and FIG. 9 shows a spherical aberration (mm), astigmatism (mm), and a distortion (%), respectively, of the imaging lens in Numerical Data Example 3. As shown in FIGS. 8 and 9, according to the imaging lens of Numerical Data Example 3, the aberrations are satisfactorily corrected.

NUMERICAL DATA EXAMPLE 4

Basic data are shown below.

f = 7.35 mm, Fno = 2.3, ω = 39.2°
Unit: mm

Surface Data

| Surface Number i | r | d | nd | vd |
|---|---|---|---|---|
| (Object) | ∞ | ∞ | | |
| 1* | 3.284 | 1.097 | 1.5346 | 56.1 (vd1) |
| 2* | −41.278 | −0.061 | | |
| 3 (Stop) | ∞ | 0.104 | | |
| 4* | 16.339 | 0.299 | 1.6355 | 24.0 (=vd2) |
| 5* | 6.448 | 0.078 | | |
| 6* | 15.586 | 0.602 | 1.5346 | 56.1 (=vd3) |
| 7* | −30.644 | 0.812 (D34) | | |
| 8* | −3.447 | 0.534 | 1.6355 | 24.0 (=vd4) |
| 9* | −3.472 | 0.034 | | |
| 10* | −44.466 (=R5f) | 0.887 | 1.6355 | 24.0 (=vd5) |
| 11* | 14.579 (=R5r) | 0.392 | | |
| 12* | 7.094 | 1.189 | 1.5346 | 56.1 (=vd6) |
| 13* | 5.783 | 0.373 | | |
| 14* | 9.726 | 1.627 | 1.5346 | 56.1 (=vd7) |
| 15* | 4.323 | 0.440 | | |
| 16 | ∞ | 0.300 | 1.5168 | 64.2 |
| 17 | ∞ | 0.328 | | |
| (Image plane) | ∞ | | | |

Aspheric Surface Data

First Surface k = 0.000, $A_4$ = −4.169E−03, $A_6$ = −4.078E−04, $A_8$ = −3.491E−04, $A_{10}$ = −2.123E−05, $A_{12}$ = 2.610E−07, $A_{14}$ = 6.742E−07, $A_{16}$ = 1.211E−07
Second Surface k = 0.000, $A_4$ = 1.162E−02, $A_6$ = −1.409E−02, $A_8$ = 5.302E−03, $A_{10}$ = −9.313E−04, $A_{12}$ = 7.885E−05, $A_{14}$ = −7.132E−06, $A_{16}$ = 2.874E−07
Fourth Surface k = 0.000, $A_4$ = 1.251E−02, $A_6$ = −1.964E−02, $A_8$ = 7.896E−03, $A_{10}$ = −1.291E−03, $A_{12}$ = 8.829E−05, $A_{14}$ = −2.178E−06, $A_{16}$ = −3.084E−06
Fifth Surface k = 0.000, $A_4$ = 7.229E−03, $A_6$ = −1.230E−02, $A_8$ = 3.715E−03, $A_{10}$ = −2.866E−04, $A_{12}$ = −3.531E−05, $A_{14}$ = −1.328E−05, $A_{16}$ = −6.873E−07
Sixth Surface k = 0.000, $A_4$ = 1.555E−02, $A_6$ = −2.281E−03, $A_8$ = 1.218E−03, $A_{10}$ = −3.654E−05, $A_{12}$ = −1.982E−05, $A_{14}$ = −2.664E−06, $A_{16}$ = −1.933E−06
Seventh Surface k = 0.000, $A_4$ = −1.141E−03, $A_6$ = 1.452E−03, $A_8$ = 7.450E−04, $A_{10}$ = −5.151E−04, $A_{12}$ = 7.445E−05, $A_{14}$ = 9.947E−06, $A_{16}$ = −5.225E−06

-continued f = 7.35 mm, Fno = 2.3, ω = 39.2°
Unit: mm

Eighth Surface k = 0.000, $A_4$ = −1.467E−02, $A_6$ = 1.999E−03, $A_8$ = 4.477E−05,
$A_{10}$ = −2.515E−04, $A_{12}$ = 5.378E−06, $A_{14}$ = 3.933E−06,
$A_{16}$ = 8.021E−07
Ninth Surface k = 0.000, $A_4$ = −7.606E−03, $A_6$ = 2.109E−03, $A_8$ = 2.004E−04,
$A_{10}$ = 2.437E−05, $A_{12}$ = −2.679E−05, $A_{14}$ = 3.037E−07,
$A_{16}$ = 3.357E−06
Tenth Surface k = 0.000, $A_4$ = −9.676E−03, $A_6$ = −1.147E−03, $A_8$ = −9.354E−05,
$A_{10}$ = −6.363E−06, $A_{12}$ = −1.932E−06, $A_{14}$ = 5.625E−07,
$A_{16}$ = −3.675E−07
Eleventh Surface k = 0.000, $A_4$ = −9.125E−03, $A_6$ = −7.163E−04, $A_8$ = 1.216E−04,
$A_{10}$ = 2.175E−06, $A_{12}$ = 1.429E−07, $A_{14}$ = −5.588E−08,
$A_{16}$ = −2.586E−09
Twelfth Surface k = 0.000, $A_4$ = −1.277E−02, $A_6$ = −2.629E−04, $A_8$ = −4.583E−07,
$A_{10}$ = 2.110E−06, $A_{12}$ = 4.167E−07, $A_{14}$ = 2.440E−08,
$A_{16}$ = −4.222E−09
Thirteenth Surface k = 0.000, $A_4$ = −1.036E−02, $A_6$ = −1.347E−04, $A_8$ = 2.262E−05,
$A_{10}$ = −7.439E−07, $A_{12}$ = −2.085E−08, $A_{14}$ = 7.659E−10,
$A_{16}$ = 6.534E−11
Fourteenth Surface k = 0.000, $A_4$ = −1.971E−02, $A_6$ = 1.286E−03, $A_8$ = −2.255E−05,
$A_{10}$ = −2.662E−07, $A_{12}$ = −1.014E−10, $A_{14}$ = 4.672E−11,
$A_{16}$ = 1.067E−11
Fifteenth Surface k = −5.530, $A_4$ = −8.680E−03, $A_6$ = 4.453E−04, $A_8$ = −1.374E−05,
$A_{10}$ = 1.561E−07, $A_{12}$ = 1.084E−08, $A_{14}$ = −5.127E−10,
$A_{16}$ = 6.326E−12 f1 = 5.74 mm
f2 = −16.96 mm
f3 = 19.41 mm
f4 = 102.88 mm
f5 = −17.18 mm
f6 = −85.58 mm
f7 = −16.26 mm
f45 = −19.32 mm
f67 = −14.01 mm

The values of the respective conditional expressions are as follows:
D34/f=0.11
f1/f=0.78
f2/f1=−2.95
f3/f1=3.38
f4/f=13.99
f7/f=−2.21
f45/f=−2.63
f45/f67=1.38
f4/f5=−5.99
R5f/R5r=−3.05

Accordingly, the imaging lens of Numerical Data Example 4 satisfies the above-described conditional expressions. The distance on the optical axis X from the object-side surface of the first lens L1 to the image plane IM (length in air for the filter 10) is 8.93 mm, and downsizing of the imaging lens is attained.

Figure 11:
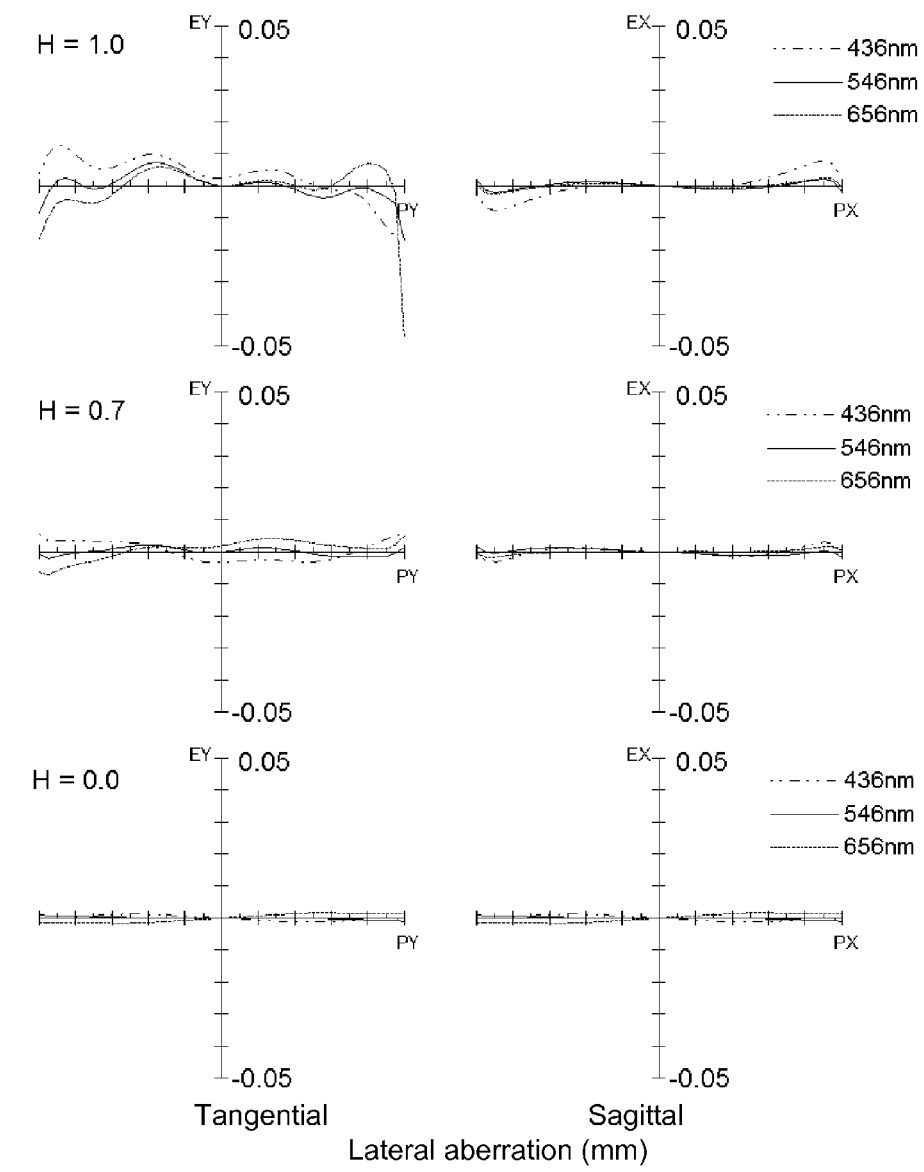
FIG. 11 is an aberration diagram showing a lateral aberration of the imaging lens of FIG. 10.
Figure 12:
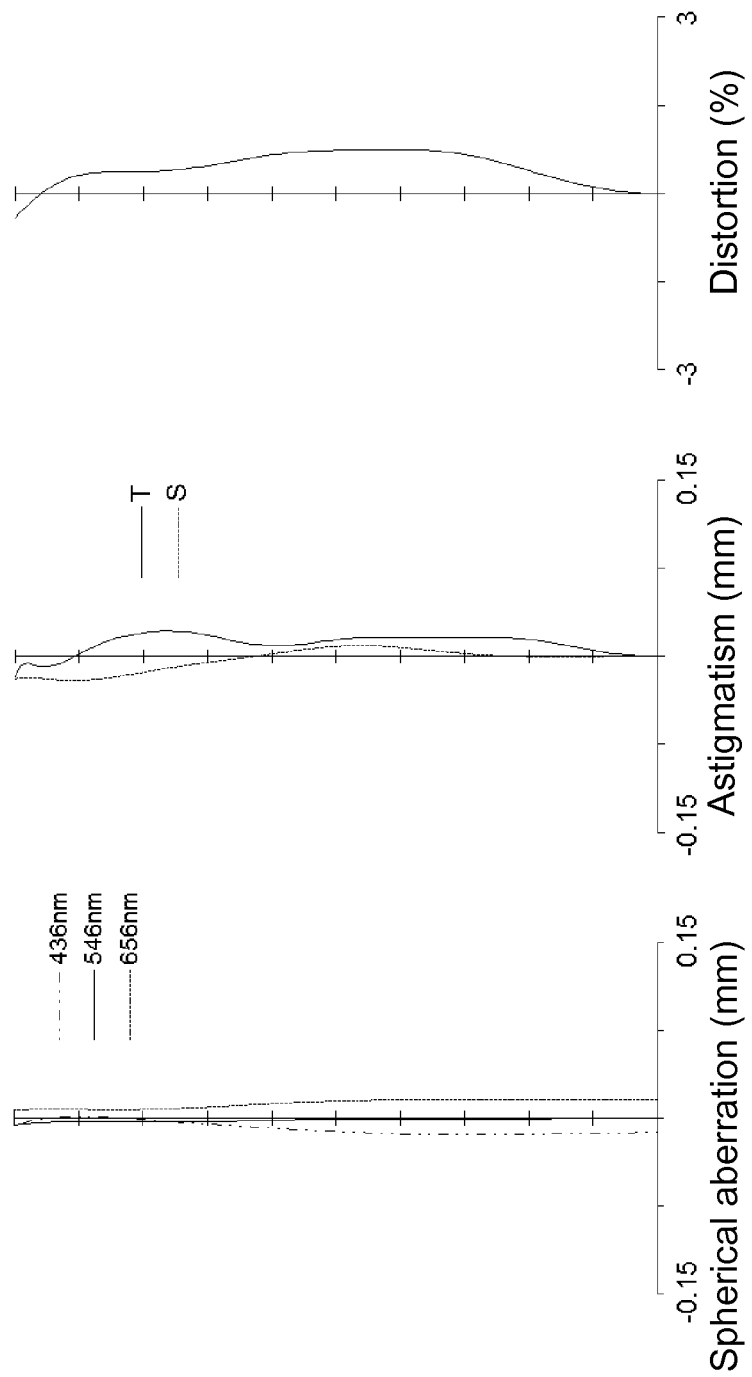
FIG. 12 is an aberration diagram showing a spherical aberration, astigmatism, and a distortion of the imaging lens of FIG. 10.
Figure 13:
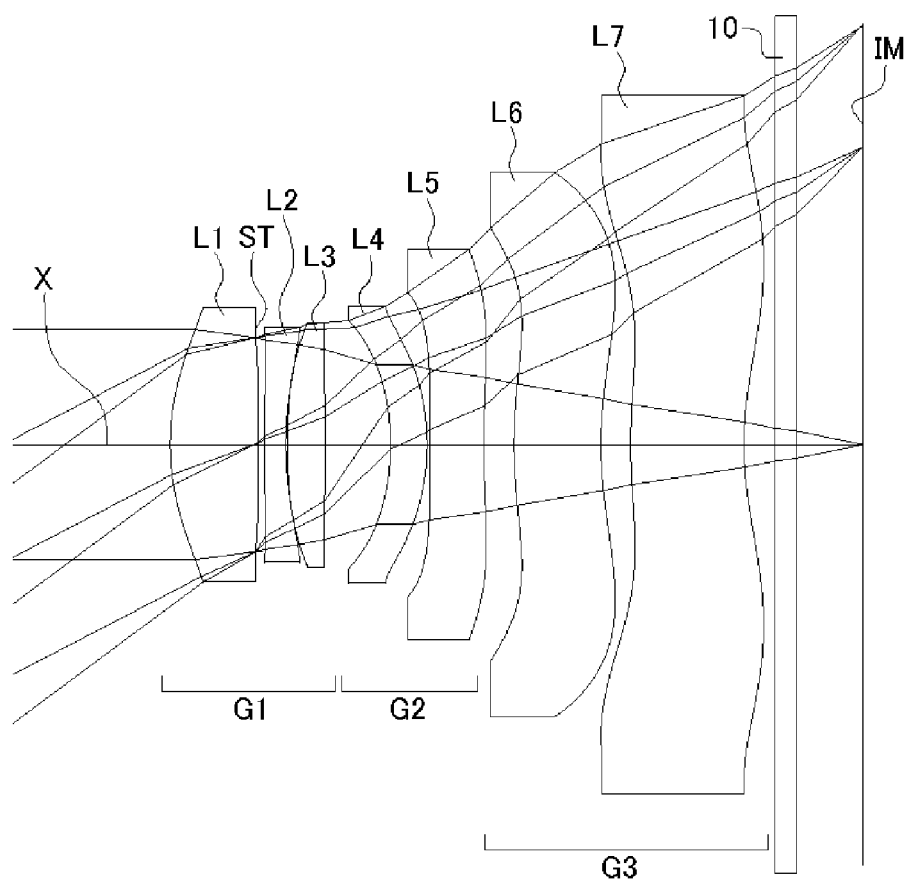
FIG. 13 shows a sectional view of a schematic configuration of an imaging lens in Numerical Data Example 5 according to the embodiment of the invention.

FIG. 11 shows the lateral aberration that corresponds to the image height ratio H, and FIG. 12 shows a spherical aberration (mm), astigmatism (mm), and a distortion (%), respectively, of the imaging lens in Numerical Data Example 4. As shown in FIGS. 11 and 12, according to the imaging lens of Numerical Data Example 4, the aberrations are also satisfactorily corrected.

NUMERICAL DATA EXAMPLE 5

Basic data are shown below.

f = 8.06 mm, Fno = 2.4, ω = 36.7°
Unit: mm

Surface Data

| Surface Number i | r | d | nd | vd |
|---|---|---|---|---|
| (Object) | ∞ | ∞ | | |
| 1* | 3.519 | 1.230 | 1.5346 | 56.1 (=vd1) |
| 2* | −43.736 | −0.036 | | |
| 3 (Stop) | ∞ | 0.125 | | |
| 4* | 47.676 | 0.299 | 1.6355 | 24.0 (=vd2) |
| 5* | 5.327 | 0.019 | | |
| 6* | 7.830 | 0.527 | 1.5346 | 56.1 (=vd3) |
| 7* | −42.991 | 0.915 D34) | | |
| 8* | −3.638 | 0.513 | 1.6355 | 24.0 (=vd4) |
| 9* | −3.324 | 0.045 | | |
| 10* | −181.880 (=R5f) | 0.746 | 1.6355 | 24.0 (=vd5) |
| 11* | 12.169 (=R5r) | 0.424 | | |
| 12* | 6.735 | 1.213 | 1.5346 | 56.1 (=vd6) |
| 13* | 5.708 | 0.417 | | |
| 14* | 7.712 | 1.582 | 1.5346 | 56.1 (=vd7) |
| 15* | 4.566 | 0.440 | | |
| 16 | ∞ | 0.300 | 1.5168 | 64.2 |
| 17 | ∞ | 0.927 | | |
| (Image plane) | ∞ | | | |

Aspheric Surface Data

First Surface k = 0.000, $A_4$ = −3.738E−03, $A_6$ = −3.235E−04, $A_8$ = −2.525E−04,
$A_{10}$ = −4.247E−06, $A_{12}$ = 1.297E−07, $A_{14}$ = 3.837E−07,
$A_{16}$ = 1.477E−09
Second Surface k = 0.000, $A_4$ = 1.218E−02, $A_6$ = −1.414E−02, $A_8$ = 5.175E−03,
$A_{10}$ = −9.562E−04, $A_{12}$ = 8.101E−05, $A_{14}$ = −1.787E−06,
$A_{16}$ = −2.744E−07
Fourth Surface k = 0.000, $A_4$ = 1.407E−02, $A_6$ = −1.966E−02, $A_8$ = 7.903E−03,
$A_{10}$ = −1.300E−03, $A_{12}$ = 6.905E−05, $A_{14}$ = −2.305E−06,
$A_{16}$ = −5.934E−07
Fifth Surface k = 0.000, $A_4$ = 6.942E−03, $A_6$ = −1.262E−02, $A_8$ = 3.669E−03,
$A_{10}$ = −2.792E−04, $A_{12}$ = −3.558E−05, $A_{14}$ = −1.217E−05,
$A_{16}$ = 1.452E−06
Sixth Surface k = 0.000, $A_4$ = 1.235E−02, $A_6$ = −2.659E−03, $A_8$ = 1.161E−03,
$A_{10}$ = −4.378E−05, $A_{12}$ = −1.366E−05, $A_{14}$ = −1.731E−06,
$A_{16}$ = −1.449E−06
Seventh Surface k = 0.000, $A_4$ = −1.528E−03, $A_6$ = 2.305E−03, $A_8$ = 8.006E−04,
$A_{10}$ = −4.974E−04, $A_{12}$ = 6.687E−05, $A_{14}$ = 5.972E−06,
$A_{16}$ = −5.146E−06

-continued $f = 8.06$ mm, Fno = 2.4, $\omega = 36.7°$
Unit: mm

Eighth Surface $k = 0.000, A_4 = -1.613E-02, A_6 = 1.695E-03, A_8 = 3.172E-05,$
$A_{10} = -2.193E-04, A_{12} = -4.379E-06, A_{14} = 9.229E-07,$
$A_{16} = 1.197E-06$
Ninth Surface $k = 0.000, A_4 = -8.300E-03, A_6 = 1.732E-03, A_8 = 1.033E-04,$
$A_{10} = 1.298E-05, A_{12} = -2.649E-05, A_{14} = 1.111E-07,$
$A_{16} = 2.724E-06$
Tenth Surface $k = 0.000, A_4 = -7.175E-03, A_6 = -1.061E-03, A_8 = -7.978E-05,$
$A_{10} = 1.302E-06, A_{12} = 1.010E-07, A_{14} = 8.469E-07,$
$A_{16} = -3.287E-07$
Eleventh Surface $k = 0.000, A_4 = -9.529E-03, A_6 = -7.676E-04, A_8 = 1.123E-04,$
$A_{10} = 1.626E-06, A_{12} = 1.332E-07, A_{14} = -4.887E-08,$
$A_{16} = -1.353E-09$
Twelfth Surface $k = 0.000, A_4 = -1.194E-02, A_6 = -3.519E-04, A_8 = -7.160E-06,$
$A_{10} = 1.572E-06, A_{12} = 4.095E-07, A_{14} = 2.596E-08,$
$A_{16} = -4.119E-09$
Thirteenth Surface $k = 0.000, A_4 = -1.040E-02, A_6 = 4.246E-05, A_8 = 3.007E-06,$
$A_{10} = -4.262E-07, A_{12} = 1.925E-08, A_{14} = 1.185E-09,$
$A_{16} = -1.213E-10$
Fourteenth Surface $k = 0.000, A_4 = -1.973E-02, A_6 = 1.274E-03, A_8 = -2.276E-05,$
$A_{10} = -2.640E-07, A_{12} = 1.481E-10, A_{14} = 5.884E-11,$
$A_{16} = 1.155E-11$
Fifteenth Surface $k = -6.301, A_4 = -8.669E-03, A_6 = 4.496E-04, A_8 = -1.287E-05,$
$A_{10} = 1.473E-07, A_{12} = 1.087E-08, A_{14} = -5.094E-10,$
$A_{16} = 6.416E-12$ f1 = 6.15 mm
f2 = −9.46 mm
f3 = 12.43 mm
f4 = 37.05 mm
f5 = −17.92 mm
f6 = −119.05 mm
f7 = −25.39 mm
f45 = −32.09 mm
f67 = −21.52 mm The values of the respective conditional expressions are as follows:
D34/f=0.11
f1/f=0.76
f2/f1=−1.54
f3/f=2.02
f4/f=4.60
f7/f=−3.15
f45/f=−3.98
f45/f67=1.49
f4/f5=−2.07
R5f/R5r=−14.95

Accordingly, the imaging lens of Numerical Data Example 5 satisfies the above-described conditional expressions. The distance on the optical axis X from the object-side surface of the first lens L1 to the image plane IM (length in air for the filter 10) is 9.58 mm, and downsizing of the imaging lens is attained.

Figure 14:
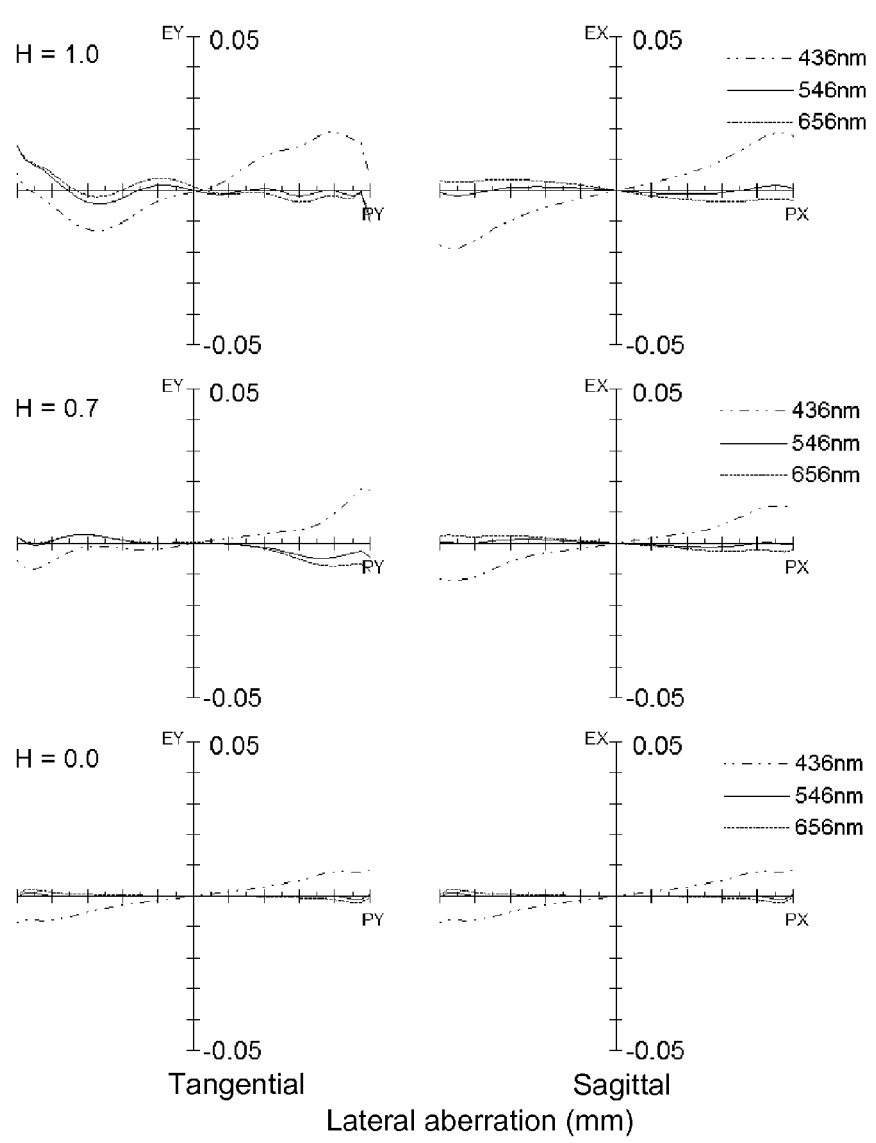
FIG. 14 is an aberration diagram showing a lateral aberration of the imaging lens of FIG. 13.
Figure 15:
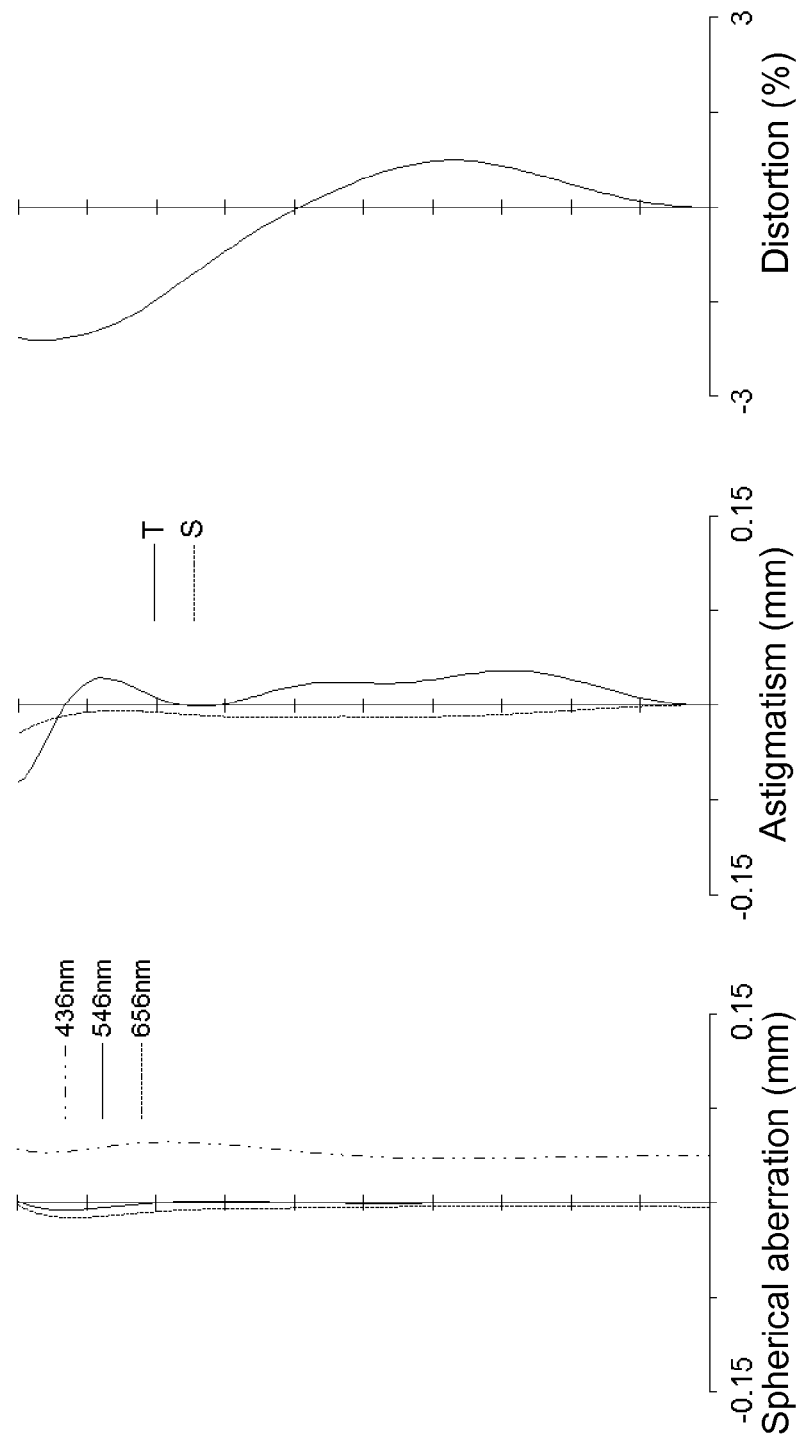
FIG. 15 is an aberration diagram showing a spherical aberration, astigmatism, and a distortion of the imaging lens of FIG. 13
Figure 16:
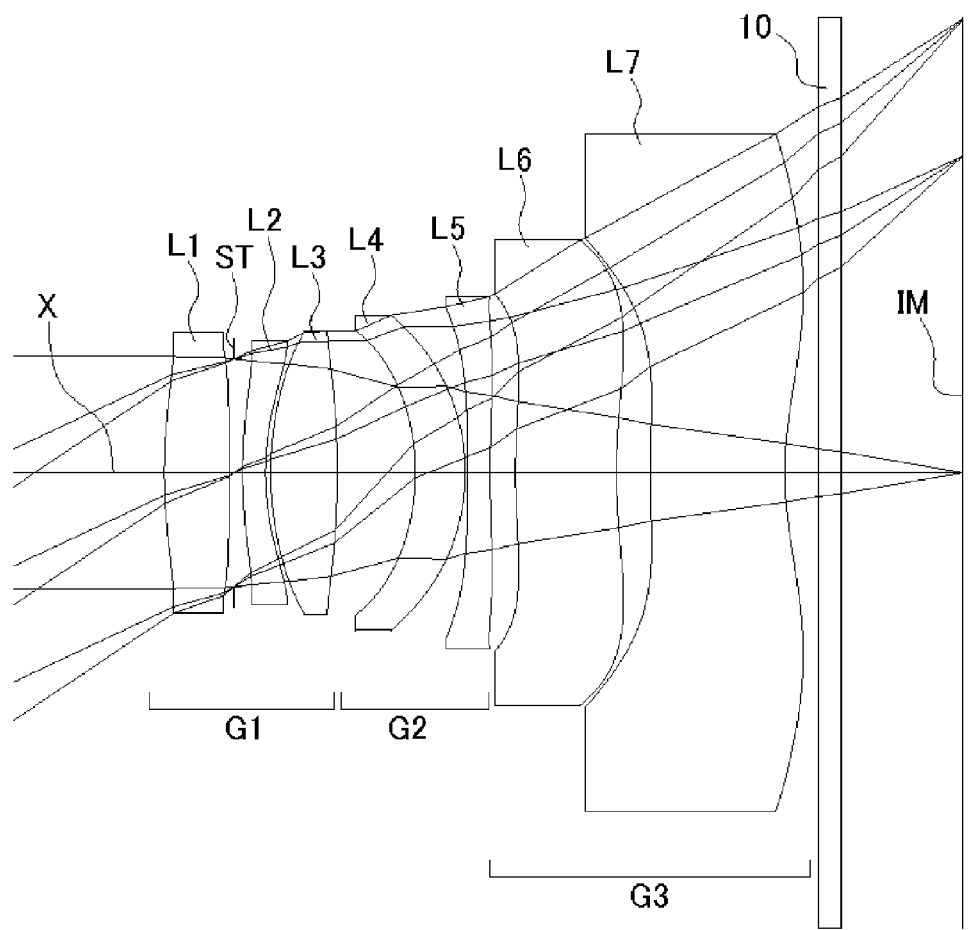
FIG. 16 shows a sectional view of a schematic configuration of an imaging lens in Numerical Data Example 6 according to the embodiment of the invention.

FIG. 14 shows the lateral aberration that corresponds to the image height ratio H, and FIG. 15 shows a spherical aberration (mm), astigmatism (mm), and a distortion (%), respectively, of the imaging lens in Numerical Data Example 5. As shown in FIGS. 14 and 15, according to the imaging lens of Numerical Data Example 5, the aberrations are satisfactorily corrected.

NUMERICAL DATA EXAMPLE 6

Basic data are shown below.

$f = 8.93$ mm, Fno = 2.8, $\omega = 33.9°$
Unit: mm

Surface Data

| Surface Number i | r | d | nd | vd |
|---|---|---|---|---|
| (Object) | ∞ | ∞ | | |
| 1* | 6.683 | 0.853 | 1.5346 | 56.1 (=vd1) |
| 2* | −51.133 | 0.069 | | |
| 3 (Stop) | ∞ | 0.111 | | |
| 4* | 7.880 | 0.299 | 1.6355 | 24.0 (=vd2) |
| 5* | 3.682 | 0.070 | | |
| 6* | 4.594 | 0.877 | 1.5346 | 56.1 (=vd3) |
| 7* | −11.902 | 1.028 (D34) | | |
| 8* | −3.035 | 0.655 | 1.6355 | 24.0 (=vd4) |
| 9* | −2.802 | 0.030 | | |
| 10* | −42.999 (=R5f) | 0.298 | 1.6355 | 24.0 (=vd5) |
| 11* | 14.098 (=R5r) | 0.331 | | |
| 12* | 9.201 | 1.328 | 1.5346 | 56.1 (=vd6) |
| 13* | 7.097 | 0.449 | | |
| 14* | 12.009 | 1.771 | 1.5346 | 56.1 (=vd7) |
| 15* | 4.382 | 0.440 | | |
| 16 | ∞ | 0.300 | 1.5168 | 64.2 |
| 17 | ∞ | 1.600 | | |
| (Image plane) | ∞ | | | |

Aspheric Surface Data

First Surface $k = 0.000, A_4 = -7.782E-03, A_6 = -1.177E-03, A_8 = -1.175E-04,$
$A_{10} = 4.130E-05, A_{12} = 3.467E-06, A_{14} = -1.766E-06,$
$A_{16} = -9.763E-08$
Second Surface $k = 0.000, A_4 = 1.010E-02, A_6 = -1.413E-02, A_8 = 5.073E-03,$
$A_{10} = -9.946E-04, A_{12} = 8.088E-05, A_{14} = -3.474E-06,$
$A_{16} = 2.959E-07$
Fourth Surface $k = 0.000, A_4 = 1.775E-02, A_6 = -2.060E-02, A_8 = 7.347E-03,$
$A_{10} = -1.405E-03, A_{12} = 8.285E-05, A_{14} = 2.845E-07,$
$A_{16} = -1.140E-06$
Fifth Surface $k = 0.000, A_4 = 4.923E-03, A_6 = -1.347E-02, A_8 = 3.690E-03,$
$A_{10} = -3.028E-04, A_{12} = -5.945E-05, A_{14} = -1.046E-05,$
$A_{16} = 3.130E-06$
Sixth Surface $k = 0.000, A_4 = 5.430E-03, A_6 = -3.288E-03, A_8 = 1.168E-03,$
$A_{10} = -6.284E-05, A_{12} = -1.431E-05, A_{14} = 1.804E-06,$
$A_{16} = 3.837E-08$
Seventh Surface $k = 0.000, A_4 = -3.444E-03, A_6 = 3.905E-04, A_8 = 7.971E-04,$
$A_{10} = -4.552E-04, A_{12} = 8.340E-05, A_{14} = 1.510E-05,$
$A_{16} = -4.234E-06$ -continued f = 8.93 mm, Fno = 2.8, ω = 33.9°
Unit: mm Eighth Surface k = 0.000, $A_4$ = −8.809E−03, $A_6$ = 1.883E−03, $A_8$ = 1.021E−04,
$A_{10}$ = −2.569E−04, $A_{12}$ = −2.580E−06, $A_{14}$ = 1.061E−07,
$A_{16}$ = 2.437E−06

Ninth Surface k = 0.000, $A_4$ = −6.076E−03, $A_6$ = 1.390E−03, $A_8$ = −5.220E−05,
$A_{10}$ = 1.206E−05, $A_{12}$ = −3.014E−05, $A_{14}$ = −1.892E−06,
$A_{16}$ = 1.631E−06

Tenth Surface k = 0.000, $A_4$ = −8.118E−03, $A_6$ = −9.568E−04, $A_8$ = −6.600E−07,
$A_{10}$ = 7.759E−06, $A_{12}$ = 1.983E−07, $A_{14}$ = 1.370E−06,
$A_{16}$ = 1.286E−07

Eleventh Surface k = 0.000, $A_4$ = −1.040E−02, $A_6$ = −4.846E−04, $A_8$ = 1.569E−04,
$A_{10}$ = 4.655E−06, $A_{12}$ = 7.814E−07, $A_{14}$ = 5.787E−08,
$A_{16}$ = −3.112E−09

Twelfth Surface k = 0.000, $A_4$ = −1.719E−02, $A_6$ = 3.869E−04, $A_8$ = −7.549E−05,
$A_{10}$ = −3.876E−06, $A_{12}$ = −6.834E−07, $A_{14}$ = −2.606E−08,
$A_{16}$ = −3.026E−09

Thirteenth Surface k = 0.000, $A_4$ = −1.312E−02, $A_6$ = 1.113E−04, $A_8$ = 1.496E−05,
$A_{10}$ = −2.630E−06, $A_{12}$ = −9.533E−08, $A_{14}$ = 2.912E−09,
$A_{16}$ = 3.249E−10

Fourteenth Surface k = 0.000, $A_4$ = −2.466E−02, $A_6$ = 1.435E−03, $A_8$ = −2.603E−05,
$A_{10}$ = −7.716E−07, $A_{12}$ = 3.384E−09, $A_{14}$ = 3.450E−10,
$A_{16}$ = 2.218E−10

Fifteenth Surface k = −10.832, $A_4$ = −8.158E−03, $A_6$ = 4.589E−04, $A_8$ = −1.305E−05,
$A_{10}$ = 1.129E−07, $A_{12}$ = 1.019E−08, $A_{14}$ = −5.212E−10,
$A_{16}$ = 6.303E−12 f1 = 11.11 mm
f2 = −11.18 mm
f3 = 6.32 mm
f4 = 27.43 mm
f5 = −16.67 mm
f6 = −74.40 mm
f7 = −14.04 mm
f45 = −35.47 mm
f67 = −11.99 mm

The values of the respective conditional expressions are as follows:
D34/f=0.12
f1/f=1.24
f2/f1=−1.01
f3/f1=0.57
f4/f=3.07
f7/f=−1.57
f45/f=−3.97
f45/f67=2.96
f4/f5=−1.65
R5f/R5r=−3.05

Accordingly, the imaging lens of Numerical Data Example 6 satisfies the above-described conditional expressions. The distance on the optical axis X from the object-side surface of the first lens L1 to the image plane IM (length in air for the filter 10) is 10.41 mm, and downsizing of the imaging lens is attained.

Figure 17:
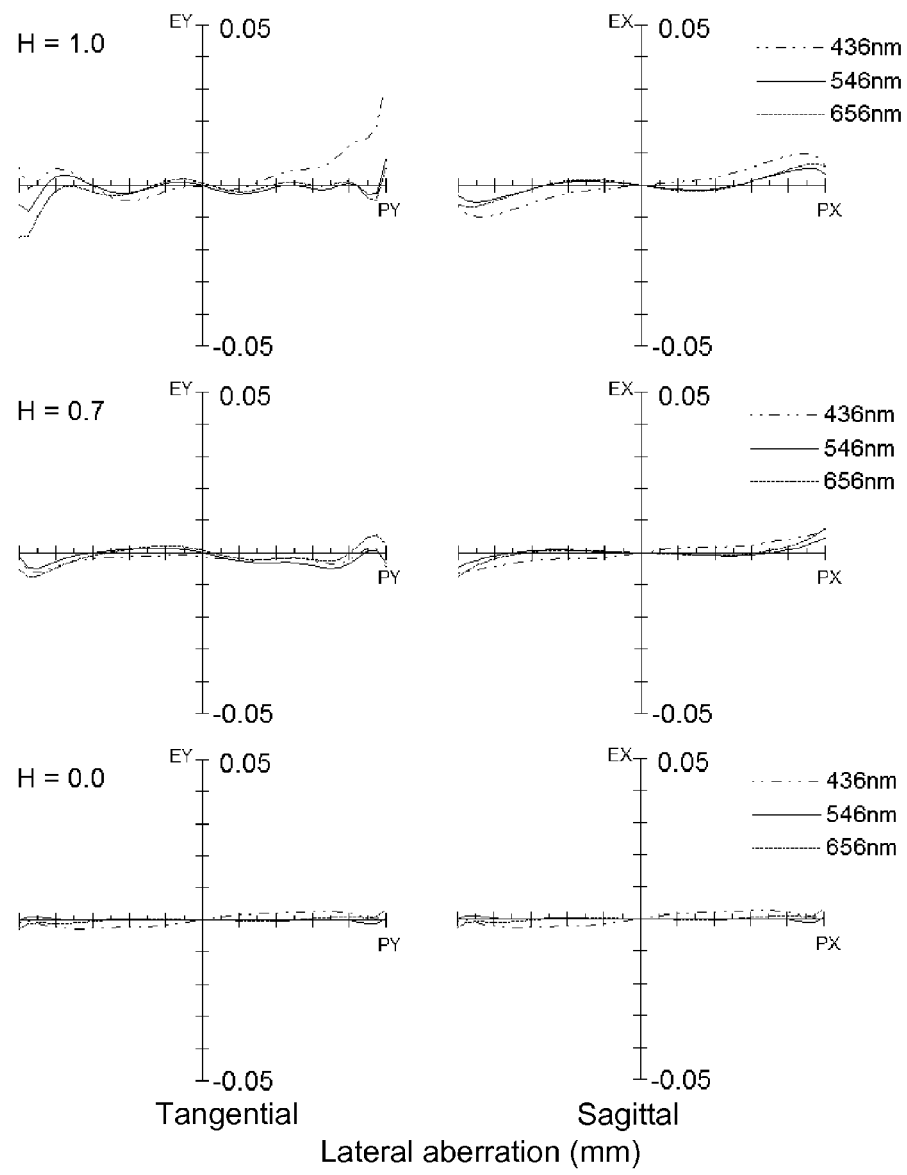
FIG. 17 is an aberration diagram showing a lateral aberration of the imaging lens of FIG. 16.
Figure 18:
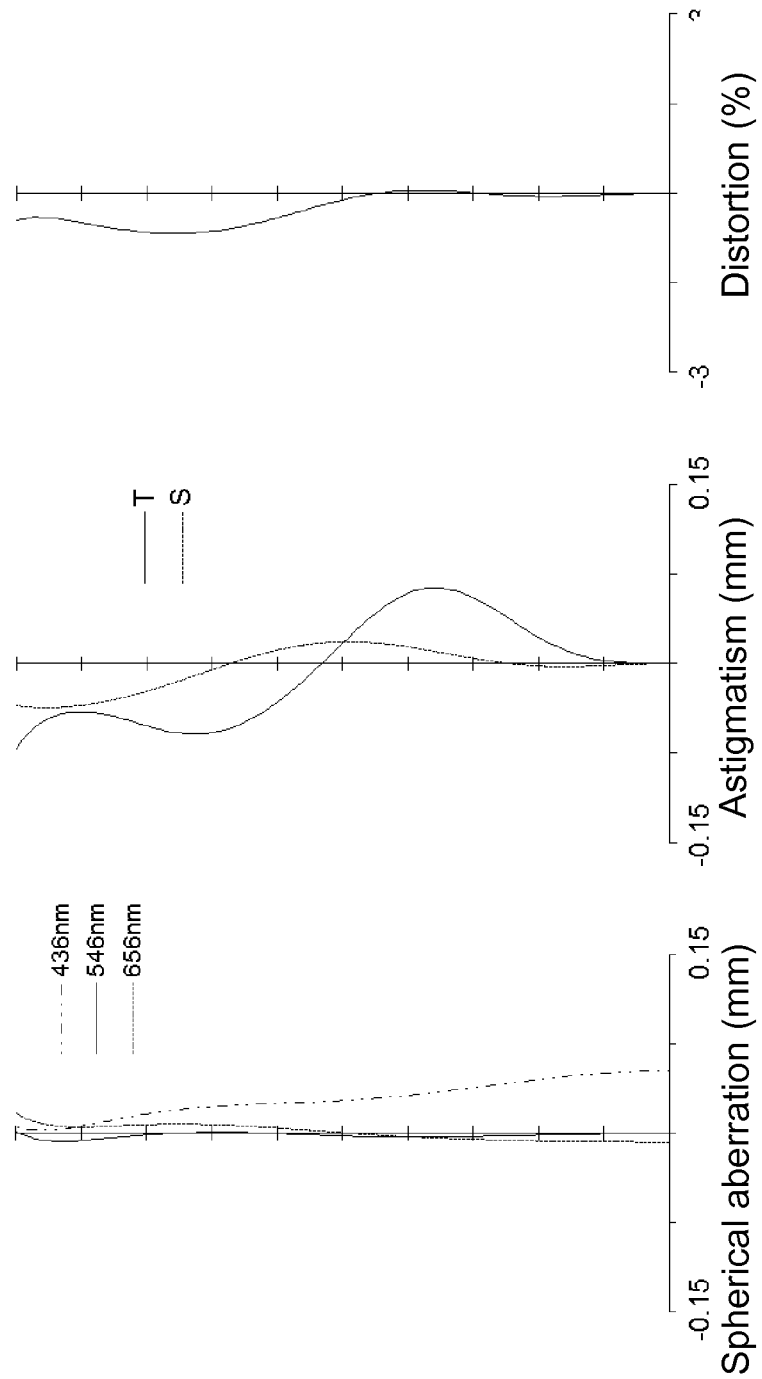
FIG. 18 is an aberration diagram showing a spherical aberration, astigmatism, and a distortion of the imaging lens of FIG. 16.

FIG. 17 shows the lateral aberration that corresponds to the image height ratio H, and FIG. 18 shows a spherical aberration (mm), astigmatism (mm), and a distortion (%), respectively, of the imaging lens in Numerical Data Example 6. As shown in FIGS. 17 and 18, according to the imaging lens of Numerical Data Example 6, the aberrations are satisfactorily corrected.

According to the above-described imaging lens of the embodiment, it is achievable to obtain a wide angle of view (2ω) of 80° or larger. For reference, the imaging lenses according to Numerical Data Examples 1 to 6 have wide angles of view of 64.2° to 85.2°. According to the imaging lens of the embodiment, it is possible to take an image of wider range than the range that can be taken by a conventional imaging lens.

Furthermore, in these days, with advancement in digital zoom technology to enlarge any area of an image obtained through an imaging lens by image processing, an imaging element having a high pixel count has been frequently used in combination with a high-resolution imaging lens. In case of such imaging element having a high pixel count, a light-receiving area of each pixel decreases, so that an image obtained by the imaging element tends to be dark. In order to fix this issue, there is a method of improving light sensitivity of the imaging element using an electrical circuit. According to the method, however, since a noise component that does not directly contribute to formation of an image is also amplified as the light sensitivity increases, it is necessary to provide another circuit for reducing the noise. According to the imaging lenses of Numerical Data Examples 1 to 6, Fno is as small as 2.1 to 2.8. According to the imaging lens of the embodiment, it is possible to obtain sufficiently bright image without providing such electrical circuit.

Accordingly, when the imaging lens of the embodiment is applied in a camera for mounting in a portable device such as cellular phones, portable information terminals, and smartphones, and relatively small-sized cameras, such as digital still cameras, security cameras, onboard cameras, and network cameras, it is possible to attain both high functionality and downsizing of the cameras.

The disclosure of Japanese Patent Application No. 2014-002821, filed on Jan. 10, 2014, is incorporated in the application by reference.

While the invention has been explained with reference to the specific embodiment of the invention, the explanation is illustrative and the invention is limited only by the appended claims.

What is claimed is:
1. An imaging lens comprising:
a first lens group having positive refractive power;
a second lens group having negative refractive power; and
a third lens group having negative refractive power, arranged in this order from an object side to an image plane side,
wherein said first lens group includes a first lens having positive refractive power, a second lens having negative refractive power, and a third lens having positive refractive power,
said second lens group includes a fourth lens and a fifth lens,
said third lens group includes a sixth lens and a seventh lens,
said fourth lens is formed in a shape so that a surface on the object side thereof has a negative curvature radius,
said fifth lens is formed in a shape so that a surface on the image plane side thereof has a positive curvature radius, and said first lens has an Abbe's number vd1, said second lens has an Abbe's number vd2, and said third lens has an Abbe's number vd3 so that the following conditional expressions are satisfied:

$40 < vd1 < 75,$ $20 < vd2 < 35,$ $40 < vd3 < 75.$

2. The imaging lens according to claim 1, wherein said fourth lens has positive refractive power,
said fifth lens has negative refractive power, and
said fourth lens has an Abbe's number vd4 and said fifth lens has an Abbe's number vd5 so that the following conditional expressions are satisfied:

$20 < vd4 < 35$ $20 < vd5 < 35.$

3. The imaging lens according to claim 1, wherein said sixth lens has negative refractive power near an optical axis and positive refractive power increasing toward a periphery thereof, and
said seventh lens has negative refractive power near the optical axis and positive refractive power increasing toward a periphery thereof.

4. The imaging lens according to claim 1, wherein said third lens is disposed away from the fourth lens by a distance D34 on an axial axis so that the following conditional expression is satisfied:

$0.05 < D34/f < 0.2$ where f is a focal length of a whole lens system.

5. The imaging lens according to claim 1, wherein said first lens has a focal length f1 so that the following conditional expression is satisfied:

$0.5 < f1/f < 2.0$ where f is a focal length of a whole lens system.

6. The imaging lens according to claim 1, wherein said first lens has a focal length f1 and said second lens has a focal length f2 so that the following conditional expression is satisfied:

$-4 < f2/f1 < -0.5.$

7. The imaging lens according to claim 1, wherein said first lens has a focal length f1 and said third lens has a focal length f3 so that the following conditional expression is satisfied:

$0.5 < f3/f1 < 4.$

8. The imaging lens according to claim 1, wherein said fourth lens and said fifth lens have a composite focal length f45, and said sixth lens and said seventh lens have a composite focal length f67 so that the following conditional expression is satisfied:

$0.5 < f45/f67 < 5.$

\* \* \* \* \*